(12) United States Patent
Malhotra

(10) Patent No.: US 12,490,111 B2
(45) Date of Patent: Dec. 2, 2025

(54) ANTENNA SYSTEM OF IN-FLIGHT ENTERTAINMENT AND COMMUNICATION SYSTEM

(71) Applicant: Panasonic Avionics Corporation, Irvine, CA (US)

(72) Inventor: Jaideep Malhotra, Lake Forest, CA (US)

(73) Assignee: Panasonic Avionics Corporation, Irvine, CA (US)

( * ) Notice: Subject to any disclaimer, the term of this patent is extended or adjusted under 35 U.S.C. 154(b) by 560 days.

(21) Appl. No.: 17/651,757

(22) Filed: Feb. 18, 2022

(65) Prior Publication Data

US 2023/0269597 A1 Aug. 24, 2023

(51) Int. Cl.
| | |
|---|---|
| *H04W 16/18* | (2009.01) |
| *H04B 7/06* | (2006.01) |
| *H04W 4/42* | (2018.01) |
| *H04W 76/10* | (2018.01) |

(52) U.S. Cl.
CPC .......... *H04W 16/18* (2013.01); *H04B 7/0617* (2013.01); *H04W 4/42* (2018.02); *H04W 76/10* (2018.02)

(58) Field of Classification Search
CPC ....... H04W 16/18; H04W 4/42; H04W 76/10; H04B 7/0617
See application file for complete search history.

(56) References Cited

U.S. PATENT DOCUMENTS

| | | | |
|---|---|---|---|
| 6,404,388 B1 | 6/2002 | Sollenberger et al. | |
| 7,483,696 B1 * | 1/2009 | Mitchell | H04B 7/18508 455/431 |
| 7,496,361 B1 * | 2/2009 | Mitchell | H04L 67/12 455/446 |
| 7,565,143 B2 | 7/2009 | Takeuchi et al. | |

(Continued)

FOREIGN PATENT DOCUMENTS

| | | |
|---|---|---|
| CA | 3074959 A1 | 9/2020 |
| CN | 116634399 A | 8/2023 |

(Continued)

OTHER PUBLICATIONS

International Search Report and Written Opinion from International Application No. PCT/US2022/079531 dated Mar. 22, 2023 (14 pages).

(Continued)

*Primary Examiner* — Jael M Ulysse
(74) *Attorney, Agent, or Firm* — Perkins Coie LLP

(57) ABSTRACT

This patent document describes techniques related to antenna system of an in-flight entertainment and communication (IFEC) system provided in a commercial passenger vehicle. The antenna system comprises monitors associated with passenger seats on the commercial passenger vehicle and configured to display entertainment content for passengers, wireless transceivers disposed outside of the monitors and configured to transceive radio signals that have beam patterns defined according to locations of the wireless transceivers relative to passenger seats, and one or more processors communicatively coupled to the wireless transceivers and configured to support the wireless connectivity for the passengers through the wireless transceivers.

18 Claims, 22 Drawing Sheets

(56) References Cited

U.S. PATENT DOCUMENTS

| | | | |
|---|---|---|---|
| 7,620,364 B2 | 11/2009 | Higashida et al. | |
| 8,886,247 B1 | 11/2014 | Price et al. | |
| 10,693,557 B1 | 6/2020 | Ayotte | |
| 12,035,255 B2 | 7/2024 | Malhotra | |
| 12,035,424 B2 | 7/2024 | Malhotra | |
| 2004/0098745 A1* | 5/2004 | Marston | H04N 7/106 348/E7.071 |
| 2005/0170783 A1 | 8/2005 | Krishnan et al. | |
| 2007/0217622 A1 | 9/2007 | Takeuchi et al. | |
| 2008/0013601 A1 | 1/2008 | Lind et al. | |
| 2009/0052386 A1* | 2/2009 | Higashida | H04H 20/62 370/329 |
| 2009/0096857 A1* | 4/2009 | Frisco | H04N 21/226 348/14.02 |
| 2009/0100476 A1* | 4/2009 | Frisco | H04B 7/18508 725/76 |
| 2009/0288123 A1* | 11/2009 | Havlovick | B64D 11/0624 340/963 |
| 2010/0216457 A1 | 8/2010 | Ezaki et al. | |
| 2010/0231451 A1* | 9/2010 | Noguchi | H01Q 1/007 343/793 |
| 2010/0235866 A1* | 9/2010 | Jangid | H04N 21/2146 725/87 |
| 2011/0128949 A1 | 6/2011 | Ezaki et al. | |
| 2011/0219408 A1* | 9/2011 | Frisco | H04N 21/42224 725/77 |
| 2011/0244890 A1 | 10/2011 | Lehmann et al. | |
| 2011/0313826 A1* | 12/2011 | Keen | G06Q 30/0207 235/375 |
| 2011/0314487 A1* | 12/2011 | Keen | H04N 21/4784 725/23 |
| 2011/0314488 A1* | 12/2011 | Keen | H04B 7/18506 725/23 |
| 2011/0314490 A1* | 12/2011 | Keen | H04N 7/18 725/23 |
| 2012/0030708 A1 | 2/2012 | Margis et al. | |
| 2012/0240170 A1* | 9/2012 | Lynch | H04B 7/18506 725/71 |
| 2013/0074108 A1 | 3/2013 | Cline et al. | |
| 2013/0170448 A1 | 7/2013 | Higashida | |
| 2014/0013365 A1 | 1/2014 | Ezaki et al. | |
| 2014/0282684 A1* | 9/2014 | Keen | H04N 7/18 725/30 |
| 2014/0372775 A1 | 12/2014 | Li et al. | |
| 2015/0128193 A1* | 5/2015 | Frisco | H04N 21/2146 725/76 |
| 2015/0304857 A1 | 10/2015 | Hong et al. | |
| 2016/0004876 A1 | 1/2016 | Bye et al. | |
| 2016/0095045 A1 | 3/2016 | Salomon et al. | |
| 2017/0126068 A1* | 5/2017 | Greig | H02J 50/12 |
| 2017/0243485 A1 | 8/2017 | Rubin et al. | |
| 2018/0167644 A1* | 6/2018 | Frisco | H04B 7/18506 |
| 2019/0052294 A1 | 2/2019 | Abdelmonem | |
| 2019/0068718 A1 | 2/2019 | Lee | |
| 2019/0090174 A1 | 3/2019 | Rocci et al. | |
| 2019/0098478 A1* | 3/2019 | Rabii | H04W 4/42 |
| 2019/0149611 A1* | 5/2019 | Mueller | B60N 2/003 455/456.1 |
| 2019/0253980 A1 | 8/2019 | Rabii et al. | |
| 2019/0266479 A1 | 8/2019 | Sngh et al. | |
| 2019/0297585 A1* | 9/2019 | Barnes | H04W 52/52 |
| 2019/0315484 A1* | 10/2019 | Lauer | B64D 11/0015 |
| 2020/0160729 A1* | 5/2020 | Epelbaum | G08G 5/50 |
| 2020/0339266 A1 | 10/2020 | McMillan | |
| 2021/0075521 A1 | 3/2021 | Bolotski et al. | |
| 2022/0104289 A1 | 3/2022 | Bates et al. | |
| 2022/0312181 A1* | 9/2022 | Sumien | H04M 15/8351 |
| 2022/0377640 A1* | 11/2022 | Tonnerre | H04B 7/18541 |
| 2023/0146142 A1 | 5/2023 | Malhotra | |
| 2023/0147344 A1 | 5/2023 | Malhotra | |
| 2024/0188182 A1 | 6/2024 | Ying et al. | |
| 2024/0276051 A1 | 8/2024 | Malhotra | |

FOREIGN PATENT DOCUMENTS

| | | |
|---|---|---|
| CN | 118369904 A | 7/2024 |
| CN | 118383079 A | 7/2024 |
| EP | 2632208 B1 | 5/2018 |
| EP | 3859372 A1 | 8/2021 |
| EP | 4230525 A1 | 8/2023 |
| EP | 4418702 A2 | 8/2024 |
| EP | 4430817 A1 | 9/2024 |
| EP | 4430916 A1 | 9/2024 |
| WO | 2020140983 A1 | 7/2020 |
| WO | 2023086811 A1 | 5/2023 |
| WO | 2023086813 A1 | 5/2023 |

OTHER PUBLICATIONS

Extended European Search Report from European Patent Application No. 23156789.2 dated Jun. 20, 2023 (11 pages).
International Search Report and Written Opinion from International Application No. PCT/US2022/079529 dated Mar. 3, 2023 (13 pages).
Partial European Search Report from European Patent Application No. 24156897.1 dated Jul. 2, 2024 (15 pages).
Office Action issued Aug. 14, 2024, in related application, U.S. Appl. No. 18/169,083 (11 pages).
Notice of Allowance issued Dec. 12, 2024, in U.S. Appl. No. 18/169,083 (8 pages).
Extended European Search Report from European Patent Application No. 24156897.1 dated Sep. 20, 2024 (18 pages).
European Search Report mailed Aug. 4, 2025, in European Patent Application No. 22893798.3.
Partial European Search Report issued Sep. 8, 2025, in EP Application No. 22893799 (13 pages).

* cited by examiner

ANTENNA SYSTEM OF IN-FLIGHT ENTERTAINMENT AND COMMUNICATION SYSTEM

TECHNICAL FIELD

This document is generally related to systems, methods, and apparatus to improve passenger experiences during a travel in a commercial passenger vehicle such as airplanes, passenger train buses, cruise ships, and others.

BACKGROUND

Commercial travel has evolved with the increasing popularity of personal electronic devices (PED) that passengers carry on and media play devices provided in commercial passenger vehicles. Passenger experiences for travels sometime rely on wireless connections provided during travel in commercial passenger vehicles. Thus, systems in commercial passenger vehicles can be designed to provide passengers with a positive travel experience by improving wireless connections.

SUMMARY

This patent document describes exemplary systems, methods, and apparatus to improve passenger experiences by providing better qualities of wireless connectivity in commercial passenger vehicles. Various implementations of the disclosed technology are related to providing wireless transceivers that have minimized signal interferences and optimized wireless signal distributions.

In one aspect, an antenna system of an in-flight entertainment and communication (IFEC) system provided in a commercial passenger vehicle is provided. The antenna system comprises: monitors associated with passenger seats on the commercial passenger vehicle and configured to display entertainment content for passengers; wireless transceivers disposed outside of the monitors and configured to transceive radio signals that have beam patterns defined according to locations of the wireless transceivers relative to passenger seats; and one or more processors communicatively coupled to the wireless transceivers and configured to support the wireless connectivity for the passengers through the wireless transceivers.

In another aspect, an antenna system of an in-flight entertainment and communication (IFFC) system provided in a commercial passenger vehicle is provided. The antenna system comprises: a first set of antennas, each contoured to be affixed on an armrest of a first passenger seat; a second set of antennas, each comprising one or more elements structured to be fitted within a headrest of a second passenger seat; a third set of antennas, each contoured to fit along a boundary of a seatback portion of a third passenger seat; and a fourth set of antennas, each contoured to fit in a passenger controller associated with a fourth passenger seat. The first set of antennas is coupled to a first electronic circuit and is configured to radiate a first beam pattern along an upward direction from the armrest of the first passenger seat, the second set of antennas is coupled to a second electronic circuit and is configured to radiate a second beam pattern along a forward direction towards a front seat of the second passenger seat, the third set of antennas is coupled to a third electronic circuit and is configured to radiate a third beam pattern along the forward direction, and the fourth set of antennas is coupled to a fourth electronic circuit and is configured to radiate a fourth beam pattern along a lateral axis of the commercial passenger vehicle.

In another exemplary aspect, a method for supporting a wireless connectivity to passengers on a commercial passenger vehicle is provided. The method comprises: operating a wireless network onboard the commercial passenger vehicle by configuring wireless transceivers that are disposed outside seatback monitors according to beam patterns that depend on a relative position of the wireless transceivers with respect to passenger seats; receiving a request via one or more wireless transceivers, from an electronic device on the commercial passenger vehicle, to connect the electronic device to a communication network; and establishing a connection of the electronic device to the communication network using a selected wireless transceiver having a selected beam pattern suitable for the electronic device. The selected wireless transceiver is selected to minimize a radio interference with other devices on the commercial passenger vehicle caused by wave propagations along the selected beam pattern.

In yet another exemplary aspect, the above-described methods are embodied in the form of processor-executable code and stored in a non-transitory computer-readable program medium. The code included in the computer readable storage medium when executed by a processor, causes the processor to implement the methods described in this patent document.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Recent advances in wireless technologies have made wireless connection services such as on-board Wi-Fi or Bluetooth connections available during travel in a commercial passenger vehicle such as an airplane or train. Unlike the past when a passenger was not provided with wireless connection services onboard during travel, onboard wireless connection services are available in many commercial vehicles so that passengers can share their trips on social media and business travelers can use their flight time more productively. While the commercial passenger vehicle is provided with limited resources to support wireless connectivity for the passengers, as more passengers use wireless connection services in the commercial passenger vehicle, undesired circumstances, for example, unsuccessful connection issues and poor signal qualities, can be caused. Such undesired circumstances can negatively affect passenger experiences for the travel and thus there have been efforts to reduce or avoid the undesired connectivity issues.

The technical solutions described in the present document can be embodied in implementations to improve a passenger experience among other features by improving wireless connectivity within the commercial passenger vehicle. Some implementations of the disclosed technology suggest customizing radio signals by locating radio transceivers to minimize signal interferences and optimize radio signal distributions. With various examples of the disclosed technology, it is possible to provide a more reliable connectivity to a passenger during travel, which can increase passenger experience while they stay in the vehicle.

Figure 1:
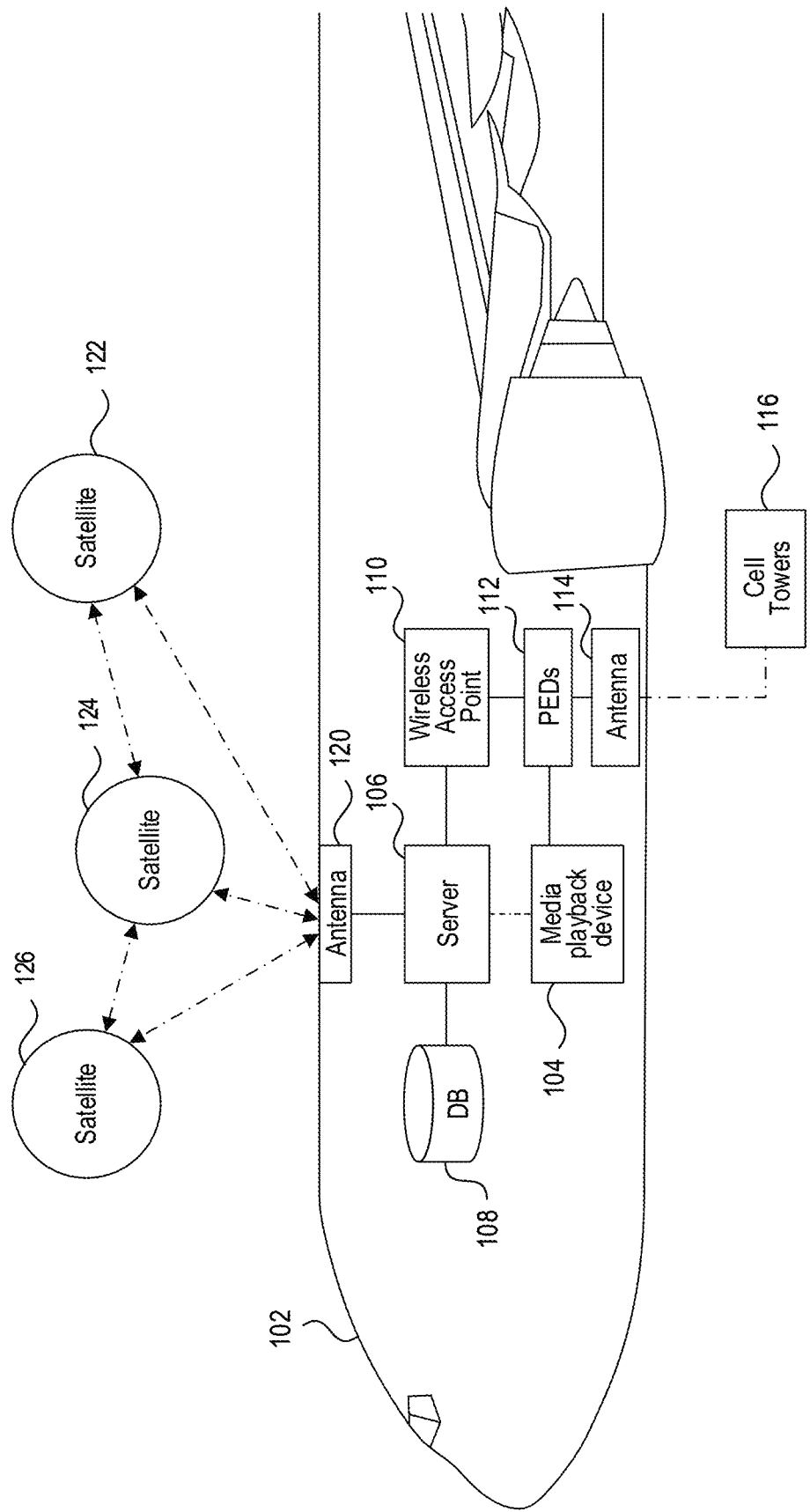
FIG. 1 shows an exemplary in-vehicle system installed in an airplane based on some implementations of the disclosed technology.

FIG. 1 shows an example of an in-flight system for passengers in a commercial passenger vehicle such as an airplane. The components shown as a single element in FIG. 1, e.g., the server 106, the database 108, the wireless access point 110, etc. can be configured in multiple elements. For example, the in-flight service system can include multiple wireless access points to facilitate or support providing of wireless coverages for the passengers.

The in-flight service system includes a server 106, media playback devices 104, and a PED (personal electronic device) that are located in the airplane 102. Most travelers carry PEDs having wireless communication capability to allow users to access Internet, such as cellular phones, smart phones, tablet computers, laptop computers, and other portable electronic devices. Many of these PEDs have the capability to execute application software programs ("apps") to perform various functions. In some implementations, the media playback devices 104 are provided at each passenger seat, such as located at each of the seatbacks of the passenger seats, and/or on cabin walls and/or deployable from an armrest for seats located at a bulkhead, i.e., in the first row of a section. The media playback devices 104 include displays/monitors for displaying entertainment contents to the passenger at passenger seats The server 106 is communicably coupled with the media playback devices 104 and the PEDs 112. The communication between the server 106 and the onboard devices including the media playback devices 104 and the PEDs 112 is either realized by wired connections or wireless connections. In some implementations, the communication among the server 106, the media playback devices 104, and the PEDs 112 are achieved through the antenna 114 to and from ground-based cell towers 116 by, for example, a provision of network plugs at the seat for plugging PEDs 112 to a wired onboard local area network. In some other implementations, the communications among the server 106, the media playback devices 104, and the PEDs 112 are achieved through the antenna 120 to and from satellites 122, 124, 126 in an orbit, e.g. via a cellular network utilizing one or more onboard base station(s), Wi-Fi utilizing the wireless access point 110, and/or Bluetooth. Thus, the server 106, the media playback devices 104, and the PEDs 112 form a local network aboard the airplane 102 through an on-board router (not shown).

In some discussions below, the Wi-Fi and Bluetooth signals may be referred to as radio signals. The radio signals propagate through beam patterns of the wireless transmitters that are configured to transmit and receive, i.e., transceiver, the radio signals. In some implementations, the server 106 is communicatively coupled with the wireless transceivers (not shown) disposed separately from the media playback devices 104. In some implementations, the wireless transceivers suggested in this patent document are communicatively coupled to electronic circuits that are included in various locations such as server 106, the media playback devices 104, a seat box, a zone terminator, or other hardware components provided in the airplane. The server 106, the media playback device 104, a seat box, a zone terminator, or other hardware components can support the wireless connectivity for corresponding passengers by communicating with the wireless transceivers. Such communications can be achieved through various manners including wired connections and wireless connections.

Figure 2A:
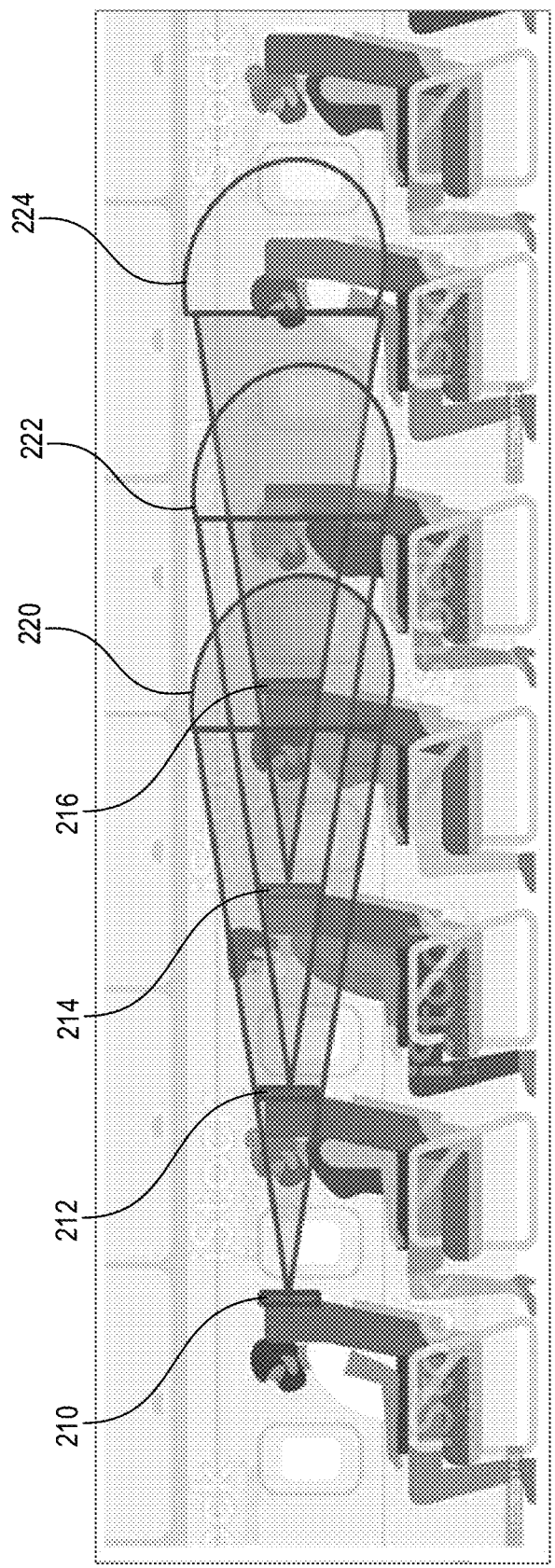
FIG. 2A shows an example view of an airplane with conventional wireless transceivers included inside media playback devices.

FIG. 2A shows an example view of an airplane with conventional wireless transceivers included inside media playback devices. In FIG. 2A, the media playback device is provided on each of the seatbacks of the passenger seats and includes built-in wireless transceivers transmitting and receiving wireless signals. Since the built-in wireless transceivers are usually provided as being included in media playback devices with monitors (which can also be referred to as screens or displays), the locations of the built-in wireless transceivers are fixed as the seatbacks of the passenger seats as well. As shown in FIG. 2A, the beam patterns 220, 222, 224 have a cone or lobe shape and the beam patterns 220, 222, 224 of the radio signals of the built-in wireless transceivers have a same backward direction that is away from a cockpit and toward passengers in the backseats. With the beam patterns 220, 222, 224 has the same backward direction, the conventional wireless transceivers included in the media playback devices with the monitors 210, 212, 214, 216 support the wireless connections for the passengers who view the monitors 210, 212, 214, 216. In this case, however, since the radio signals of all the wireless transceivers inside the airplane propagate in the same direction, very high rate of the signal overlapping occurs.

Figure 2B:
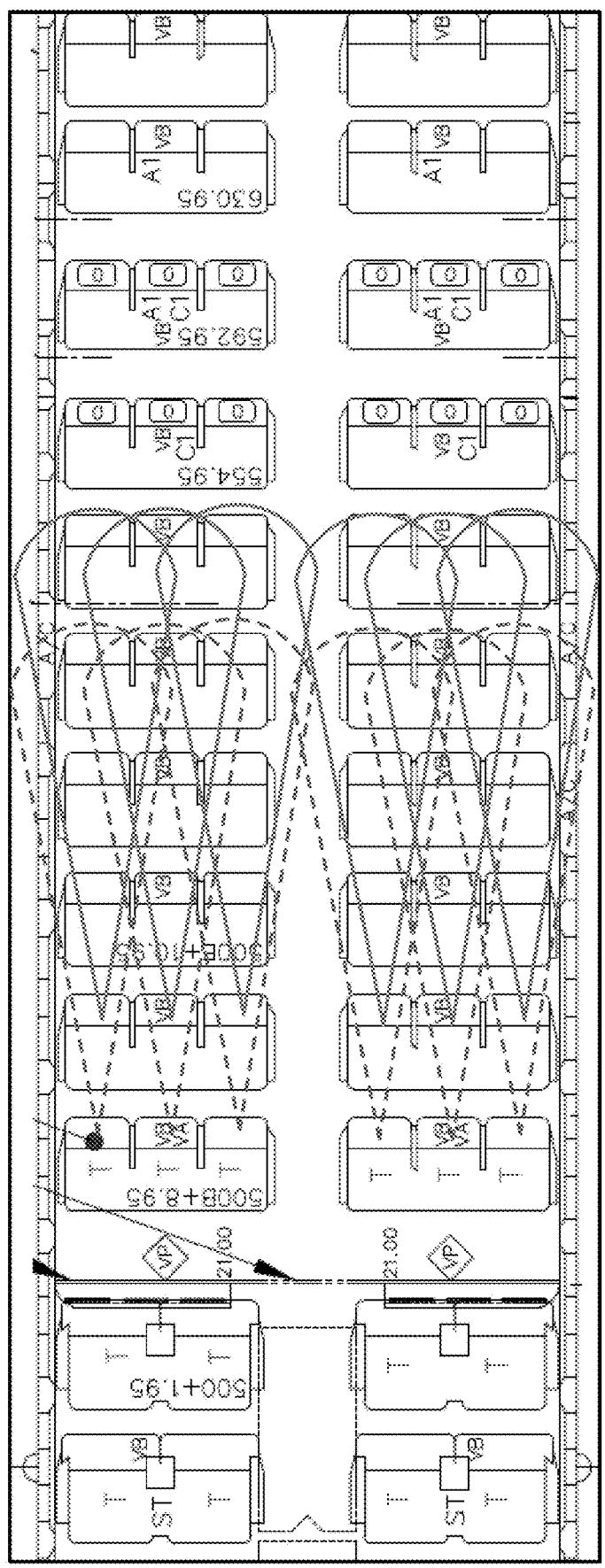
FIG. 2B shows an example top view of a narrow body airplane in which conventional wireless transceivers are installed.
Figure 2C:
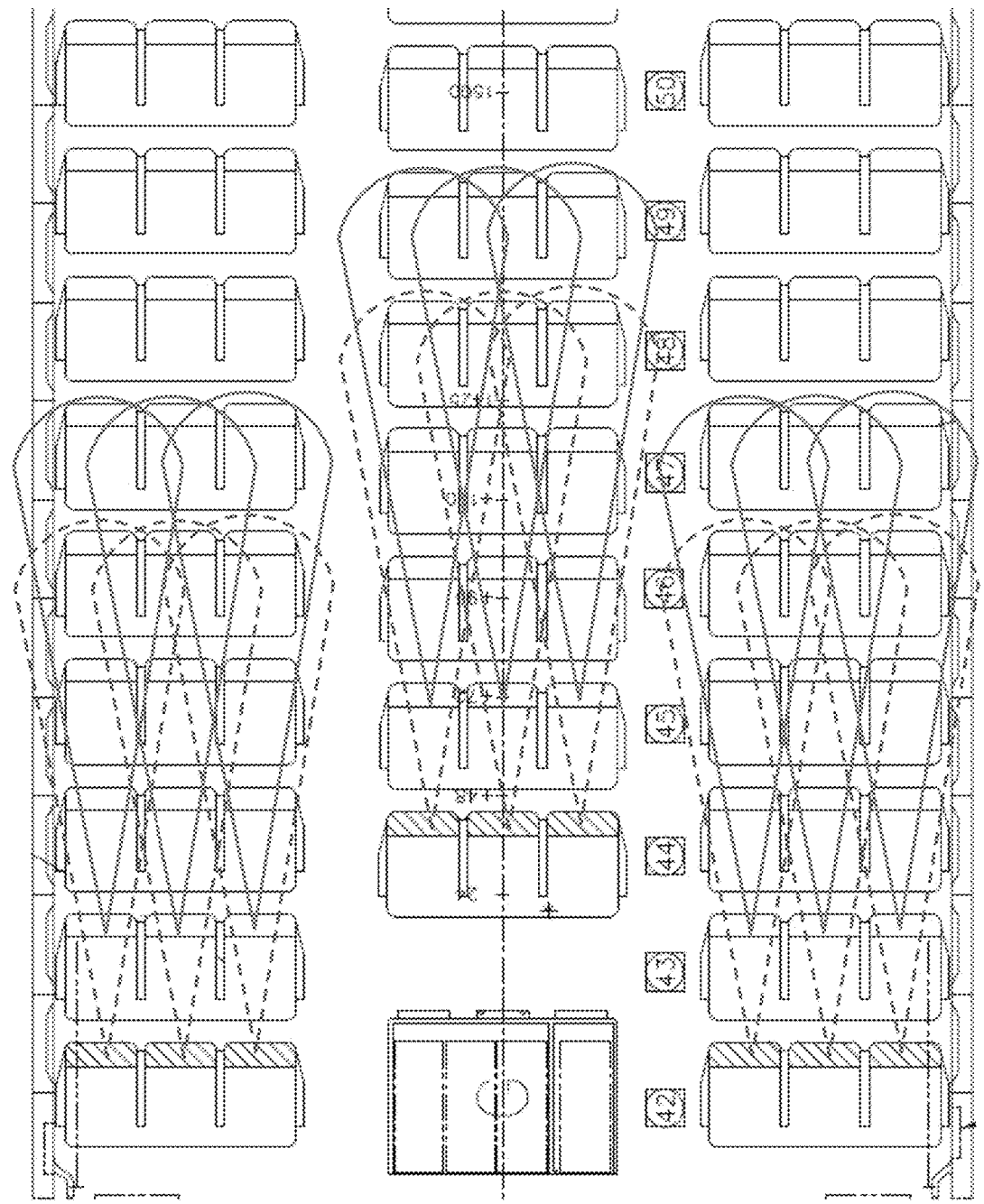
FIG. 2C shows an example top view of a wide body airplane in which conventional wireless transceivers are installed.

FIG. 2B shows an example top view of a narrow body airplane in which conventional wireless transceivers are installed and FIG. 2C shows an example top view of a wide body airplane in which conventional wireless transceivers are installed. In FIG. 2A, radio signals from only 12 passenger seats on 2 rows already show multiple signal overlapping and interferences. In FIG. 2B, radio signals from only 18 passenger seats on 2 rows already show multiple signal overlapping and interferences. These undesired signal overlapping and interferences can be more significant with more number of seats considered and additional radio signal usages will result in heavy signal congestions. With the signal congestions, signal loss under existing wireless connections can happen and any new connection request are not able to be granted, which results in unpleasant passenger experiences.

In recognition of the issues above caused by the signal congestions, some implementations of the disclosed technology address the limitations on the fixed locations of the wireless transceivers and proposes decoupling the wireless transceivers from media playback devices and positioning the wireless transceivers at locations within the airplane to reduce signal interferences and optimize radio signal distributions. In addition, some implementations of the disclosed technology allow to create localized radio zones to minimize overlap with custom, aircraft or cabin specific type layouts and reuse wireless channels with proper separation. With regard to the decoupling the wireless transceivers from the media playback devices, several implementations are discussed in the below.

Figure 3A:
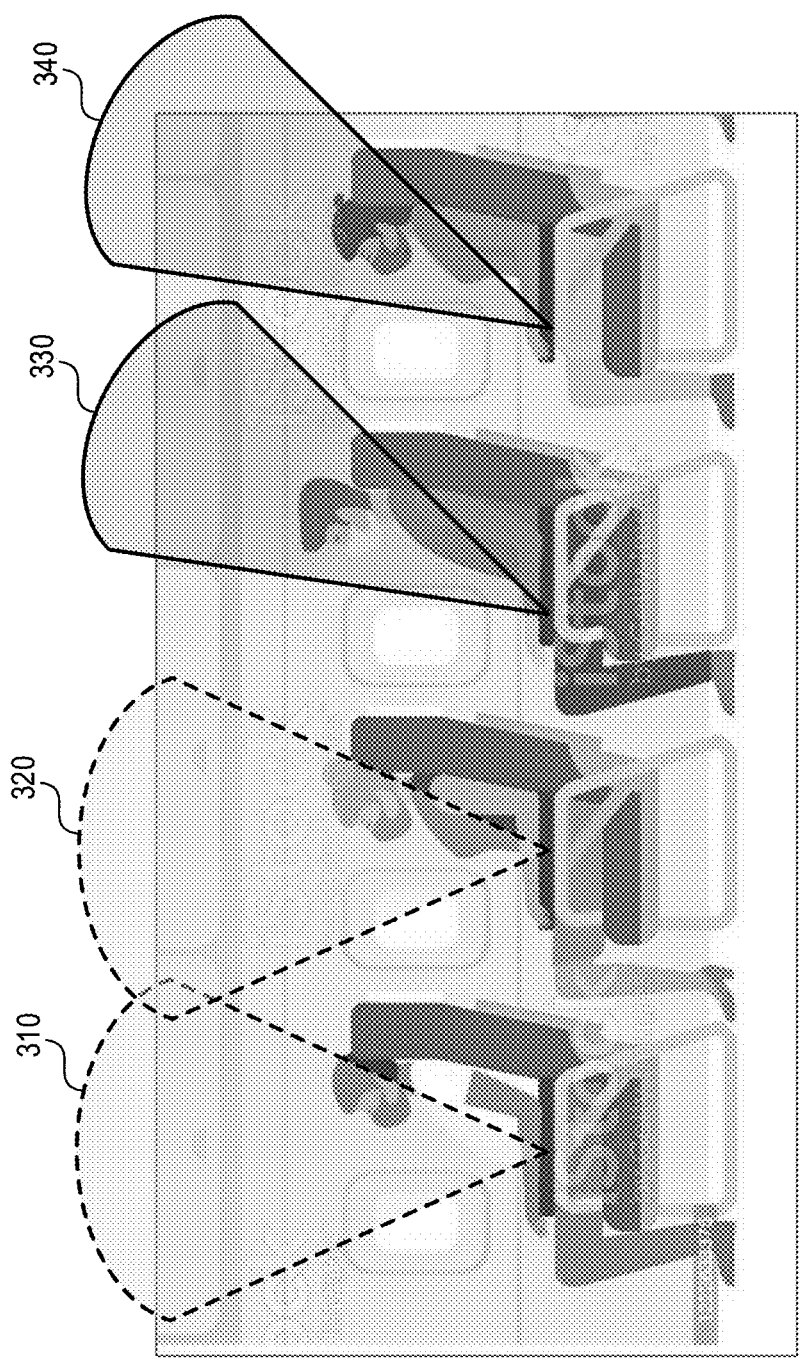
FIGS. 3A and 3B show example views of passenger seats with wireless transceivers based on some implementations of the disclosed technology.
Figure 3B:
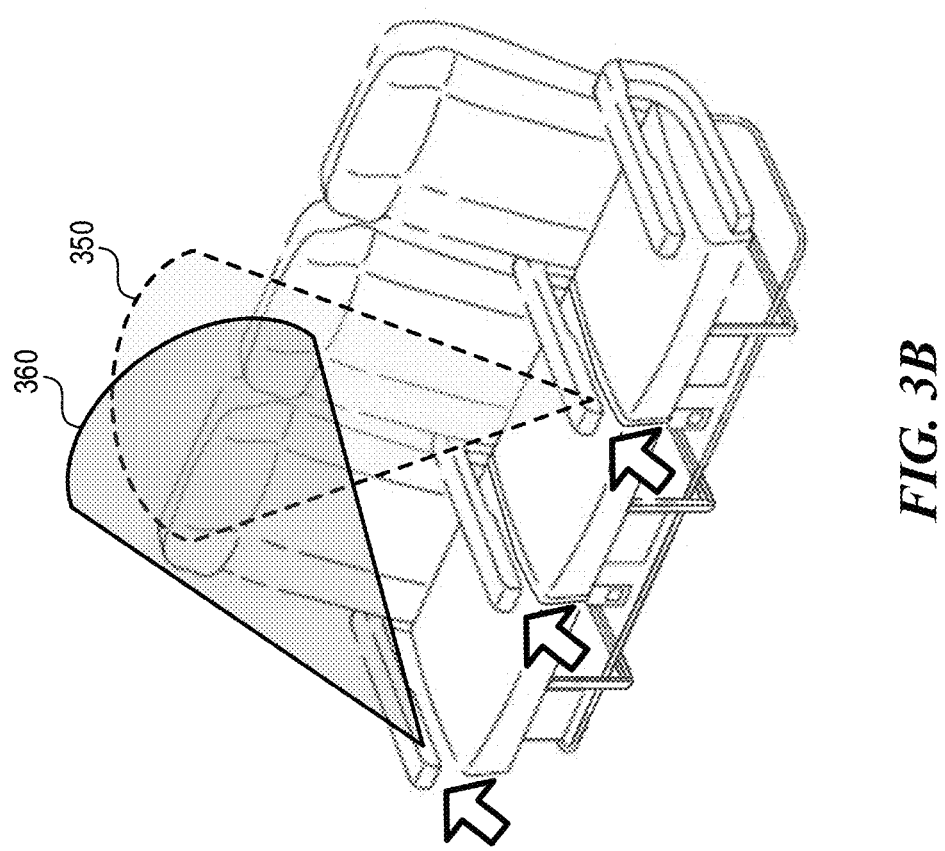
Figure 4:
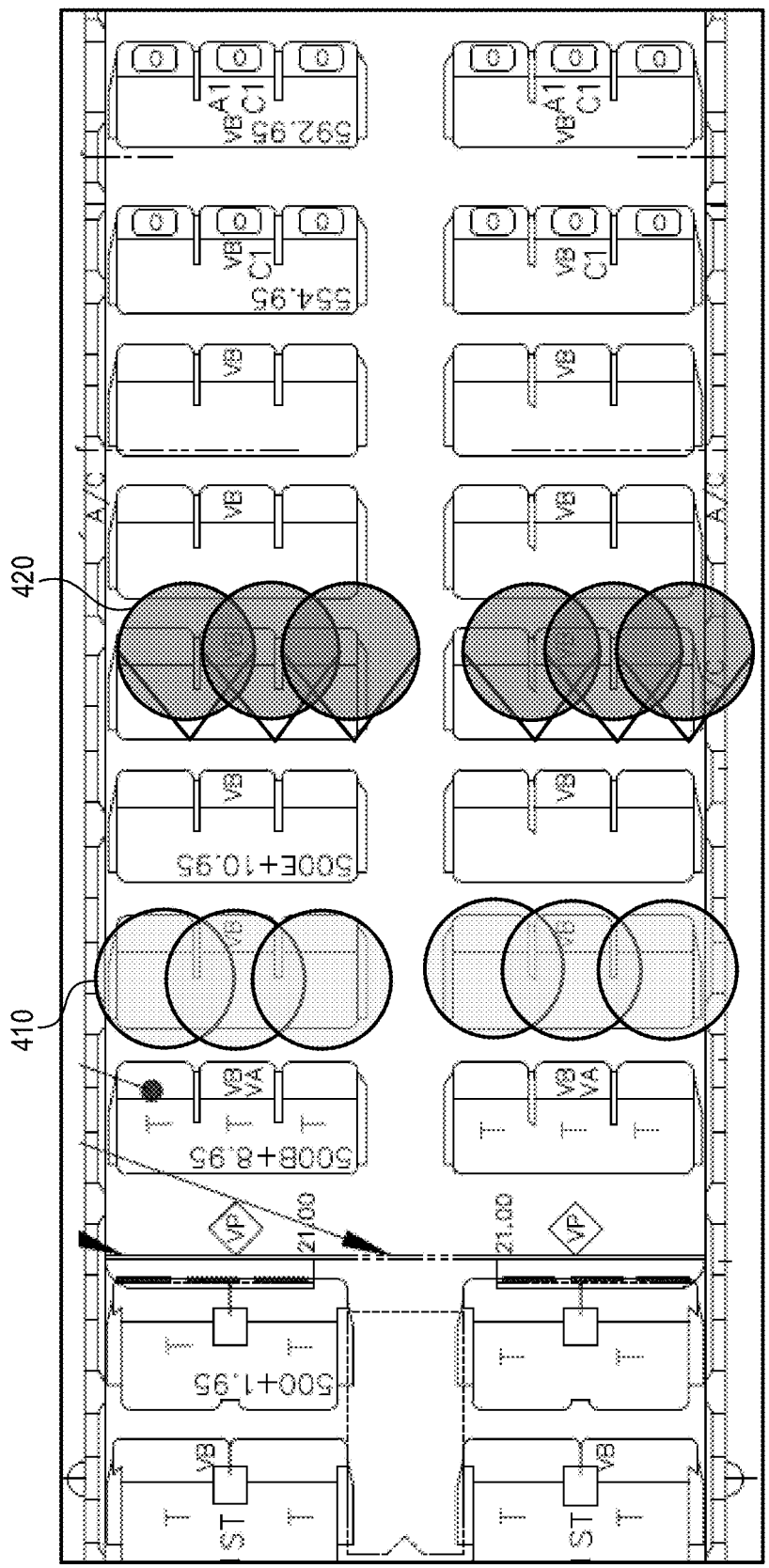
FIG. 4 shows an example of a top view of an inside of an airplane including wireless transceivers based on some implementations of the disclosed technology.

FIGS. 3A and 3B show example views of passenger seats with wireless transceivers based on some implementations of the disclosed technology. In FIGS. 3A and 3B, the wireless transceivers are located in the armrests of passenger seats outside of the media playback devices. With the space limitations, if needed, the component such as an audio jack or a remote jack mode, which is usually placed in the armrest of a passenger seat, can be relocated. By locating the wireless transceivers in the armrest of passenger seats, it is possible to make the beam patterns of the wireless transceivers have desirable direction/orientation, which are different from the backward direction as shown in FIG. 2A. As already discussed in relation to FIG. 2A, when the wireless transceivers are included in the monitor of the media playback devices located on seatbacks of the passenger seats, the beam patterns of the wireless transceivers radiate in the backward direction, which results in increasing the signal overlapping and interferences. In the implementations of FIGS. 3A and 3B in which the wireless transceivers are disposed in the armrests of the passenger seats, the wireless transceivers have beam patterns along an upward direction. In FIG. 3A, the beam patterns 310, 320 are along the straight upward direction and the beam patterns 330 and 340 are along the upward direction and slightly tilted towards corresponding passengers. In FIG. 3B, the beam patterns 350 and 360 are along the upward direction and slightly tilted. The upward direction may refer to the direction toward a position higher than the armrests of the passenger seats and may form some degrees with respect to a longitudinal axis of the airplane. The longitudinal axis of the airplane extends to the airplane's fuselage and may be referred to as a horizontal direction. The beam patterns 330, 340, 350 and 360 form the angles between 0 and 90 degrees with respected to the longitudinal axis of the airplane FIG. 4 shows an example of a top view of an inside of an airplane including wireless transceivers based on some implementations of the disclosed technology. In FIG. 4, when the beam pattern 410 of the wireless signal has a straight upward direction, there is minimal overlapping of the wireless signals. When the beam pattern 420 of the wireless signal has a tilted upward direction, there are slightly more overlapping of the wireless signals as compared to the beam pattern 410, which however is still significantly reduced as compared to the case of FIG. 2 when the wireless transceivers are included in the media playback devices.

Figure 5:
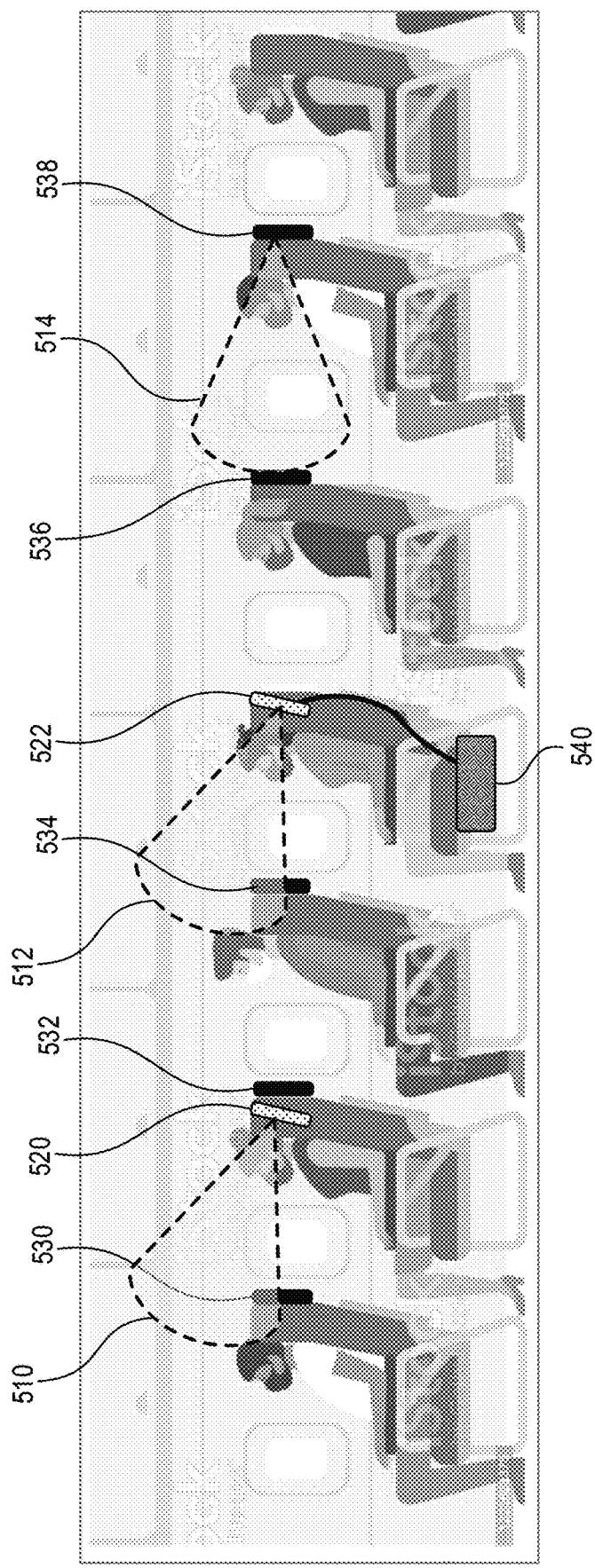
FIG. 5 shows an example view of passenger seats with wireless transceivers based on some implementations of the disclosed technology.

FIG. 5 shows an example view of passenger seats with wireless transceivers based on some implementations of the disclosed technology. In the example of FIG. 5, the wireless transceivers are implemented as antennas located in the headrests of passenger seats or located in close proximity to the monitors of the media playback devices mounted on the seatbacks of passenger seats. The antennas installed on the headsets or the monitors of the passenger seats can operate at a relatively lower power level due to the proximity of the electronic devices associated with passengers. In FIG. 5, three beam patterns 510, 512, 514 corresponding to different antennas are shown as examples. The antenna 520 has the beam pattern 510 which is toward the front passenger seat and slightly tilted. The antenna 522 connected to the seat box 540 has the beam pattern 512 which is toward the front passenger seat and slightly tilted. The antenna (the antenna is not shown in FIG. 5 but will be discussed in FIG. 7) disposed in close proximity to the monitor 538 has the beam pattern 514 which is toward the front passenger seat. Unlike the beam patterns as shown in FIG. 2A, the beam patterns 510, 512 and 514 all are directed toward the front passenger seat (and toward a cockpit) and such direction of the beam patterns 510, 512 and 514 may be referred to as the forward direction that is toward the front passenger seat with or without tilting.

In some implementations, due to the forward direction of the beam patterns, the signals can 'feed forward' for front passenger seats. For example, the monitor 530 at Row 1 has signals controlled by the antenna 520 at Row 2 and the monitor 534 at Row 3 has signals controlled by the antenna 524 at Row 4, and so forth. Thus, signals for a specific passenger seat at row N is controlled by the antenna that is disposed at the behind passenger seat at row N+1, N being a positive integer. In FIG. 5, the antenna 524 is communicatively coupled to the seat box 540. This implementation can be useful for the passenger seat at the last row in the airplane where there is no monitor installed behind and the antenna can operate or connected through the seat box 540 for its operations. The beam patterns, the location of the antennas, and connections with other components can be configured in various manners based on the installation of components including antenna, monitors, etc. and necessary calculations.

Figure 6A:
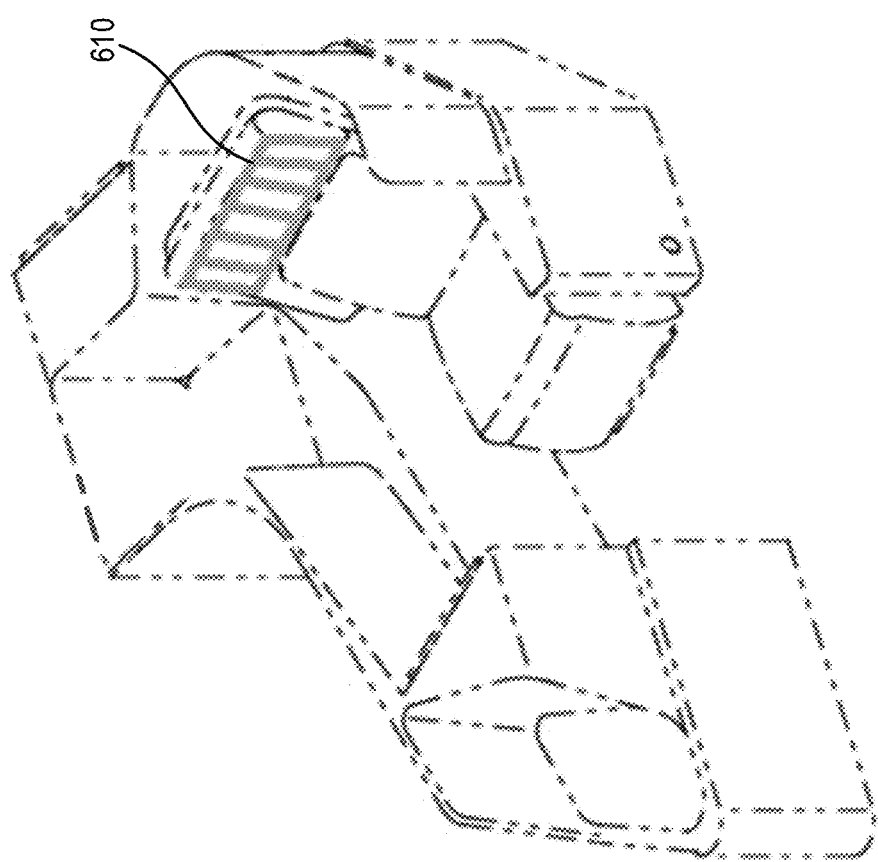
FIGS. 6A and 6B show example views of antennas based on some implementations of the disclosed technology.
Figure 6B:
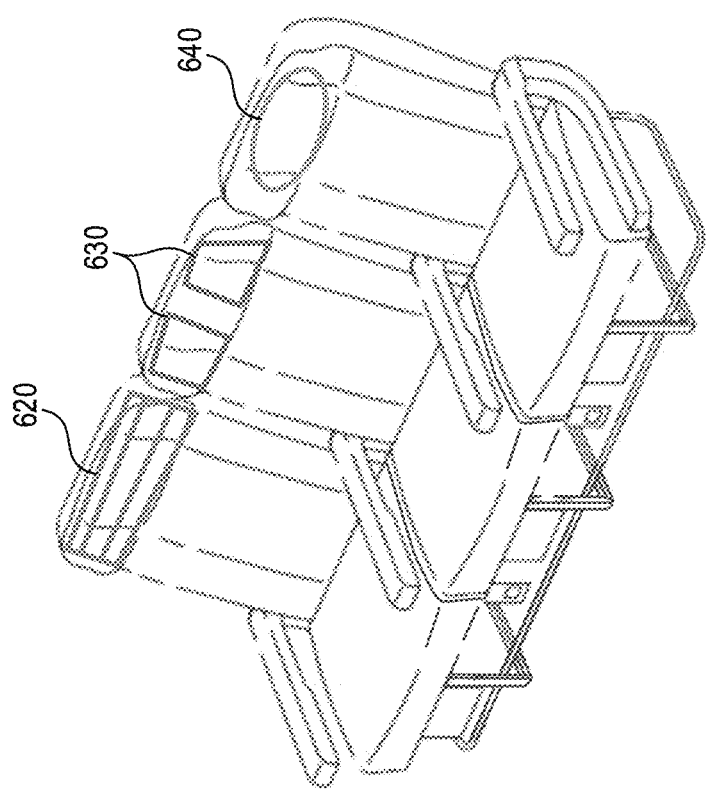

FIGS. 6A and 6B show example views of antennas based on some implementations of the disclosed technology. FIG. 6A shows the implementation of the antenna applied to the business class and FIG. 6B shows the implementation of the antenna applied to the economy class. The antennas as shown in FIGS. 6A and 6B can be implemented as the antennas installed in the headrests of passenger seats, which are shown in FIG. 5. The antennas installed in the headrests of the passenger seats operate at a relatively lower gain as compared to those in the conventional art, which are included in the monitor. While the conventional antennas included inside the monitors of the media playback devices need to have a very compact size and omnidirectional characteristics, the implementations of the disclosed technology can give more flexibilities to the required characteristics of the antennas, for example, in terms of the size and the directional characteristics.

Various antennas can be utilized for the implementations of the disclosed technology. Referring to FIGS. 6A and 6B, various types of antennas 610, 620, 630, 640 with various designs can be installed in the headrests of the passenger seats. For example, FIG. 6A shows the single piece antenna 610 with vertical grids and FIG. 6B show the single piece antenna 620 with horizontal grids, the split type antenna 630, and the oval type antenna 640. In the case of the split type antenna 630, the antenna has multiple components communicatively connected to each other such that the multiple components operate together to support the wireless connection for the corresponding passenger seat. The antennas can be also implemented as others than those as shown in FIGS. 6A and 6B, which include a flat type of an antenna, a curved type of an antenna, a wire type of an antenna, a plate type of an antenna, etc., and have various shapes including a rectangular shape, a circle shape, an oval shape, an elliptical shape, etc., depending on the locations of the antennas and other considerations such as costs, level of difficulties of the installation, etc.

Figure 7C:
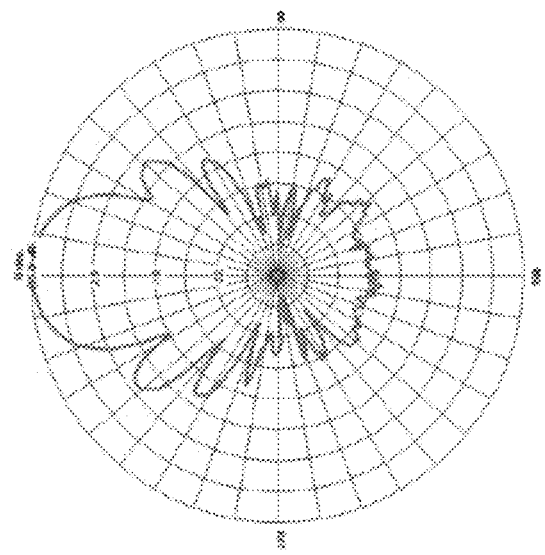
FIGS. 7A to 7E show example beam patterns of antennas that are applied to the implementations of the disclosed technology.
Figure 7B:
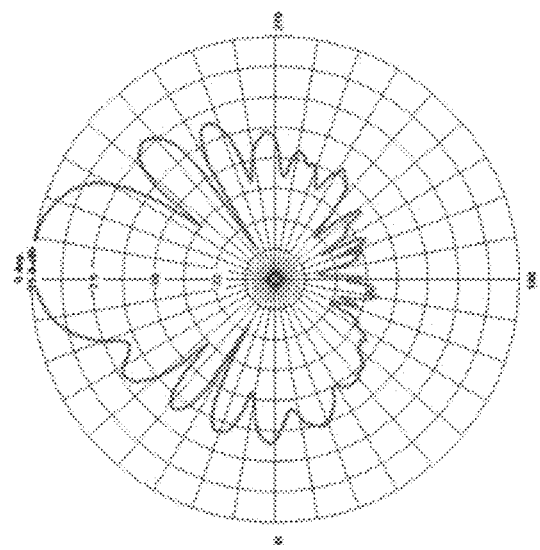
Figure 7A:
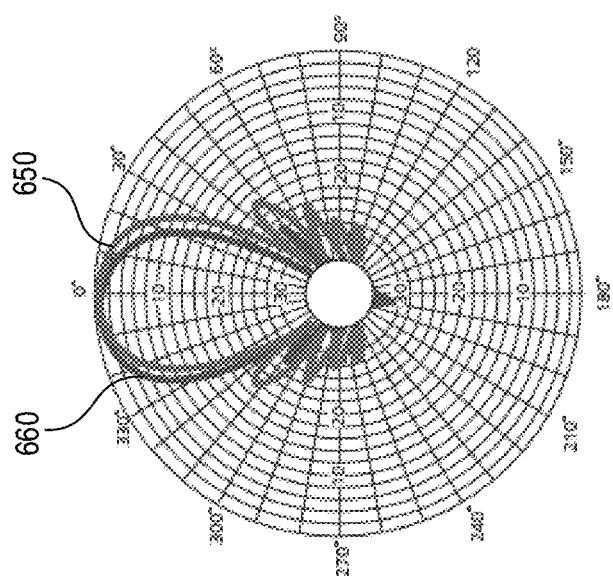
Figure 7E:
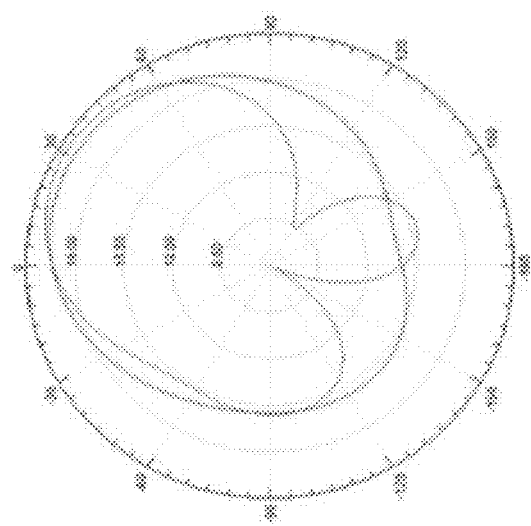
Figure 7D:
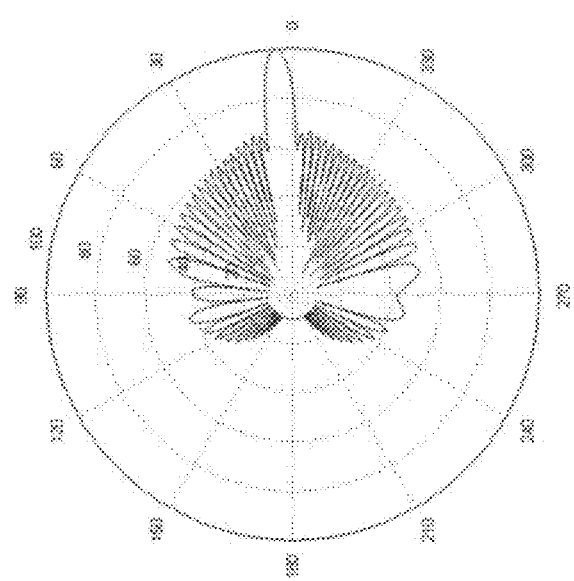

In some implementations, various types of antennas with various radiation patterns can be utilized, which include a Yagi antenna, a phased array antenna, an inverted F antenna, a plate or helical antenna, a PCB antenna, a coil antenna, and/or other miniature antenna. FIGS. 7A to 7E show example radiation patterns of antennas that can be applied to implementations of the disclosed technology. FIGS. 7A to 7C show directional radiation patterns of antennas. Yagi antenna corresponds to a high gain directional antenna for narrow operation in either vertical or horizontal operation. FIG. 7A shows the H plane (magnetic field plane) 650 and E plane (electric field plane) 660 and FIGS. 7B and 7C show H plane. FIG. 7D shows a radiation pattern of a phased array antenna. FIG. 7E shows a radiation pattern of an inverted F type antenna.

Various antennas can be implemented in consideration of various factors including radiation patterns, designs, process benefits, costs, space limitations, etc. For example, the Yagi antenna can be applied to the passenger seats to provide radiation patterns having a good directivity in a desired direction with high gain. Thus, the passenger seats on which the Yagi antennas are installed can receive the radio signals even when the radio signals have relatively low strengths and control the direction of the beam patterns to be in a desired direction. The good directivity of the Yagi antenna can be utilized especially when the beam pattern needs to be slightly tilted. The phased array antenna may be used to provide a particularly narrow beam of coverage in the passenger seats and also has the advantage of fast steering. For example, when the passenger seats on which the phased array antennas are installed move according to reclining adjustments, the phased array antennas can provide radiation patterns in the desired direction. The inverted F antenna may have benefits of manufacturing and installing it on the passenger seats.

Figure 8A:
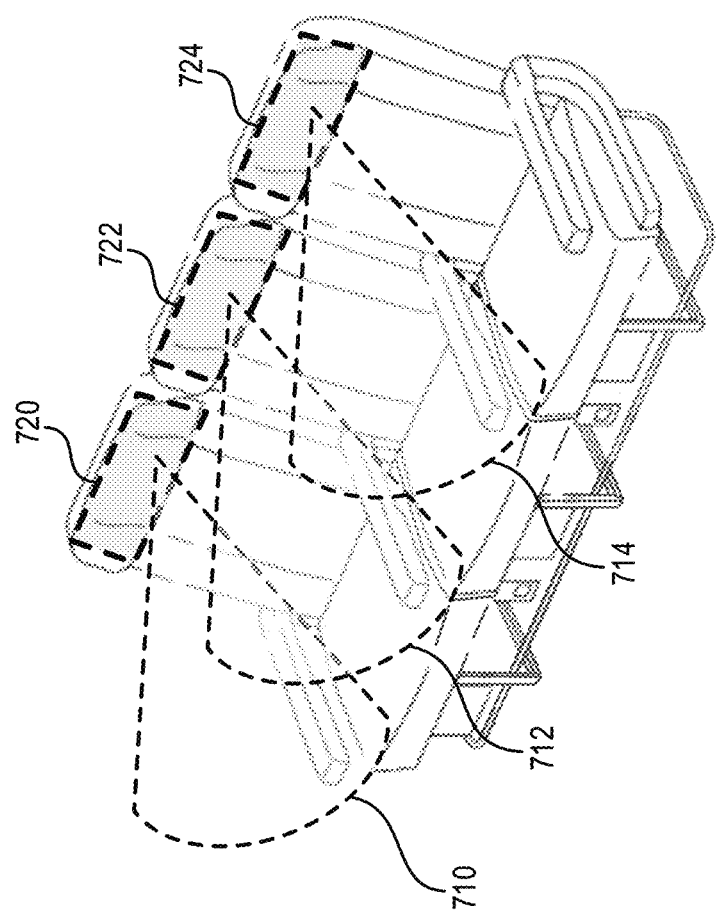
FIG. 8A shows an example view of passenger seats with monitors based on some implementations of the disclosed technology.
Figure 8B:
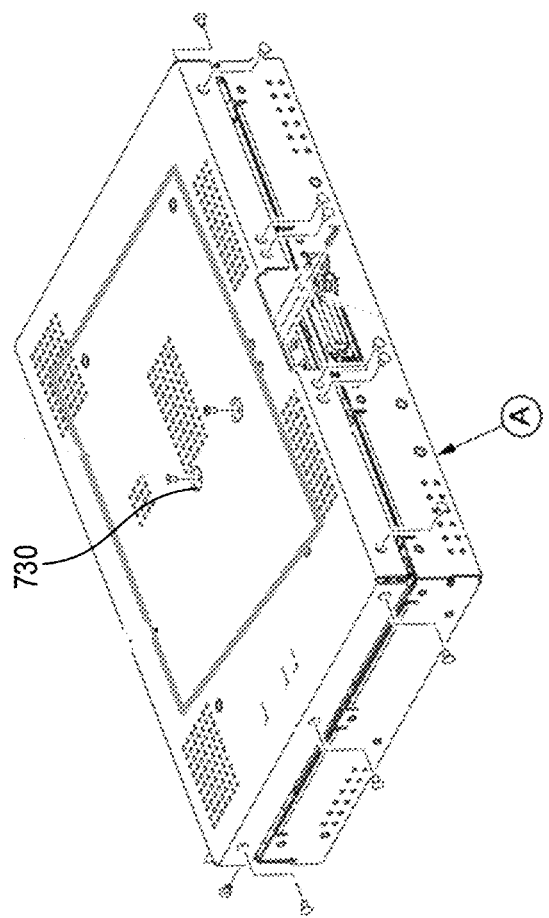
FIG. 8B shows an example view of a monitor based on some implementations of the disclosed technology.

FIG. 8A shows an example view of passenger seats with monitors based on some implementations of the disclosed technology and FIG. 8B shows an example view of a monitor based on some implementations of the disclosed technology. The monitors as shown in FIGS. 8A and 8B can be implemented as the monitor 538 which is shown in FIG. 5. Referring to FIG. 8A, the monitors 720, 722, 724 are placed on the headrests of the passenger seats and the beam patterns 710, 712, 714 have the forward direction. Referring to FIG. 8B, the antenna 730 is placed on the back of the monitor, which is the outside of the monitor to make the beam pattern have a forward direction. In FIG. 8B, the arrow 'A' indicates the monitor, on which the antenna 730 is placed. In some implementations, the antenna 730 placed on the back of the monitor can have a single-piece type, a split type, a panel type, an oval type, an elliptical type, a flat type, a wire type, or a plate type and installed via connector(s) to the back of the monitor. In addition, the antennas 730 can be implemented with various patterns, which include which include a Yagi antenna, a phased array antenna, an inverted F antenna, a plate or helical antenna, a PCB antenna, a coil antenna, and/or other miniature antenna as previously discussed above. Although the implementation has been discussed that the antenna is disposed on the back side of the monitor 538, other implementations are also possible such that the antenna with the beam pattern along the forward direction is configured with another component such as a zone terminator or other suitable line placeable units within the airplane. In addition, although it has been discussed that the antenna 730 is disposed on the back of the monitor, as long as the antenna 730 is disposed in close proximity to the monitor, the antenna 730 can be located at different sides of the monitor.

In the implementations above, the antennas corresponding to electronic devices associated with passenger seats are respectively installed in the passenger seats in one to one correspondence. Other implementations are also possible such that multiple antennas corresponding to multiple electronic devices associated with multiple passenger seats are placed on one of the multiple passenger seats. For example, when three passenger seats are placed on a same row, three antennas supporting the wireless connections for three passenger seats can be placed on only one of the three passenger seats. In this case, the beam patterns of the three antennas placed in the single passenger seats can be controlled have desired directional characteristics to support the wireless connections for the three passenger seats. The three antennas placed in the single passenger seat can be controlled by one electronic circuit or multiple electronic circuits. In some implementations, the three antennas placed in the single passenger seat can be designed to operate for three passenger seats, respectively. In some implementations, at least one of the three antennas placed in the single passenger seat can be designed to operate for at least two passenger seats such that if an antenna corresponding to one of the three passenger seat has an error, the different antenna can still operate for that passenger seat. Although the example has been discussed for the antenna placed on the single passenger seat to support the wireless connections for the three passenger seats, other implementations are also possible.

Figure 9:
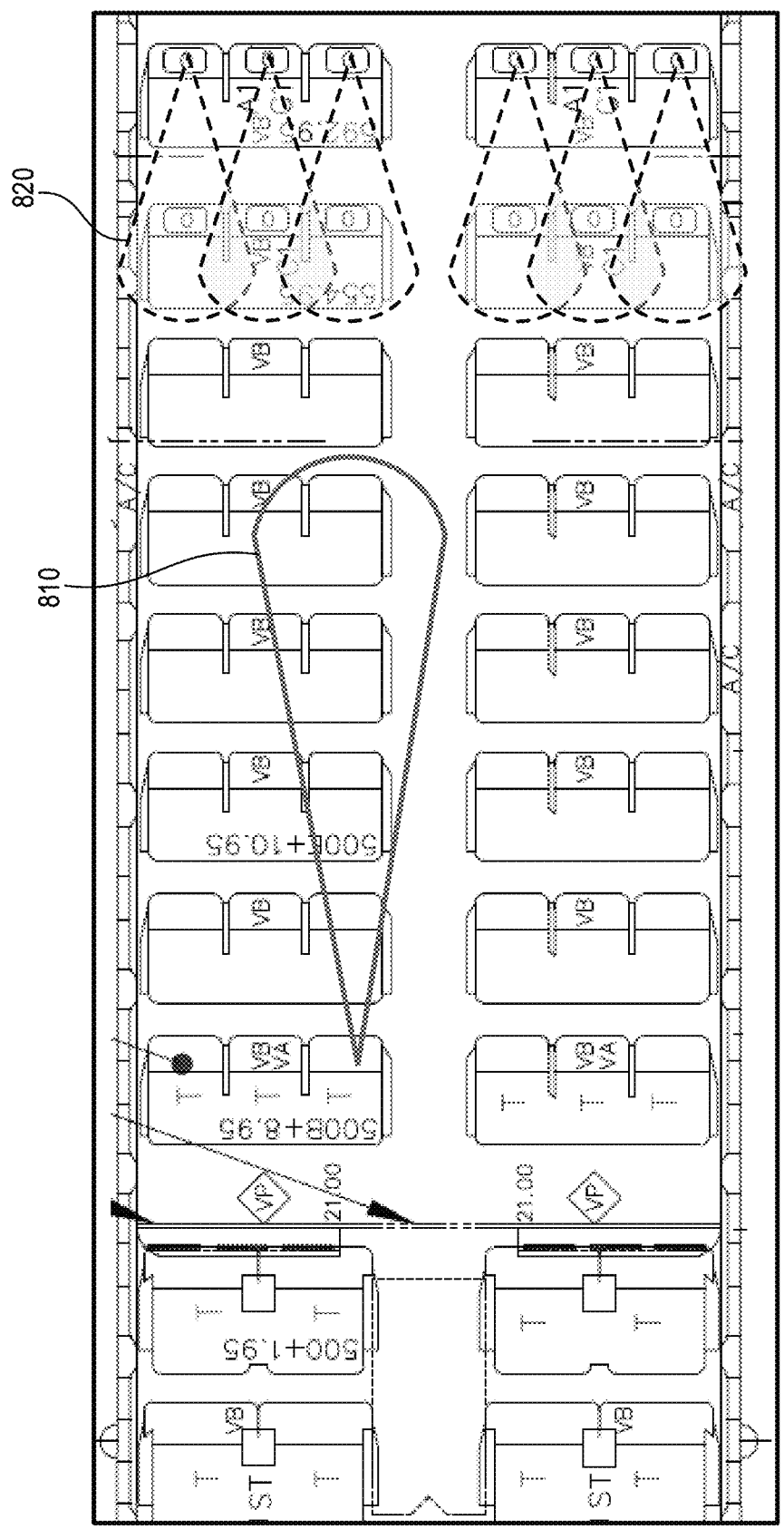
FIG. 9 shows an example of a top view of an inside of an airplane including wireless transceivers based on some implementations of the disclosed technology.

FIG. 9 shows an example of a top view of an inside of an airplane including wireless transceivers based on some implementations of the disclosed technology. The beam pattern 810 corresponds to one from the conventional wireless transceivers (see FIGS. 2A-2C) and the beam pattern 820 corresponds to one from the wireless transceivers based on some implementations of the disclosed technology. The lower power can be applied to the wireless transceivers designed based on the disclosed technology due to proximity to the electronic devices associated with the passengers such as Bluetooth headsets. As compared to FIGS. 2A-2C, the ranges of beam patterns are smaller, which allows to reduce or avoid signal congestion by creating localized zones using the wireless transceivers suggested in this patent document.

Figure 10A:
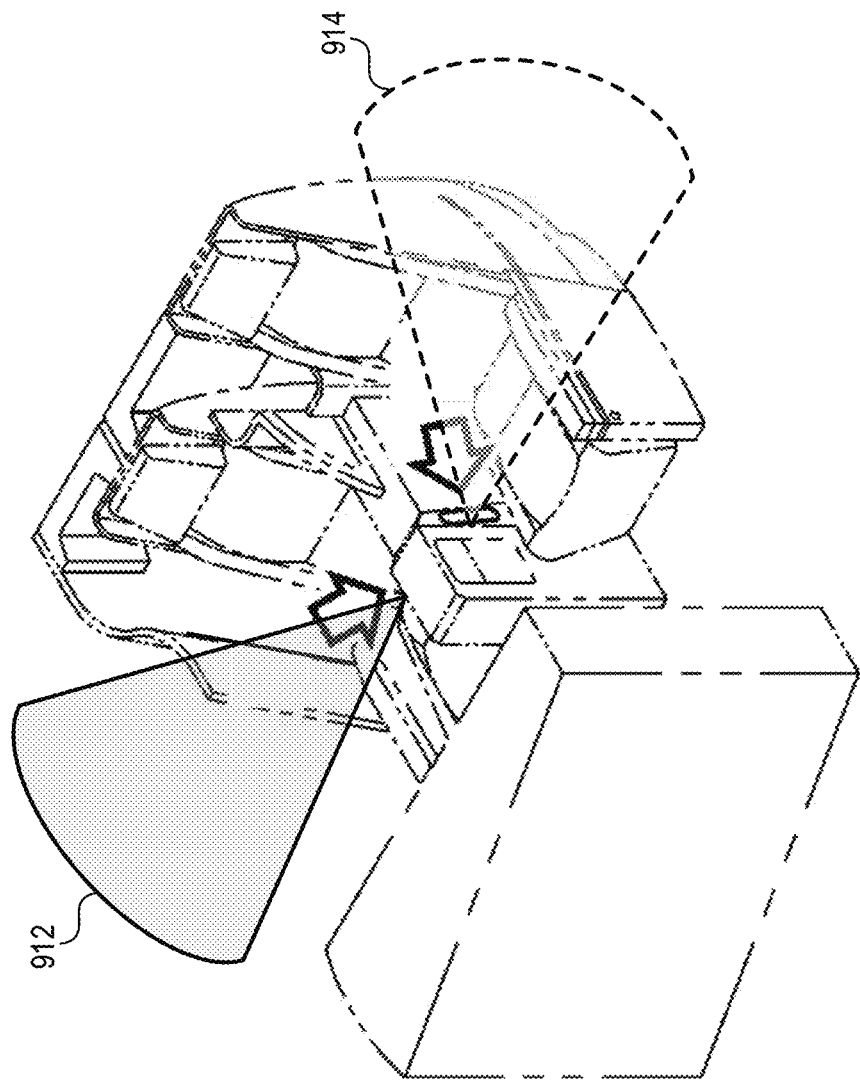
FIGS. 10A and 10B shows example views of passenger seats with wireless transceivers based on some implementations of the disclosed technology.
Figure 10B:
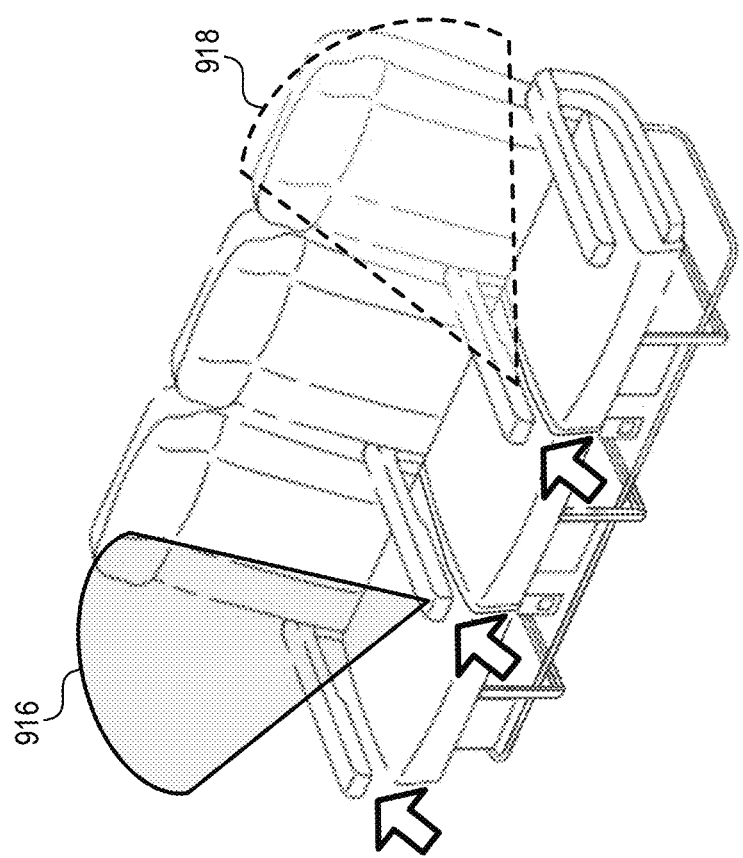
Figure 10E:
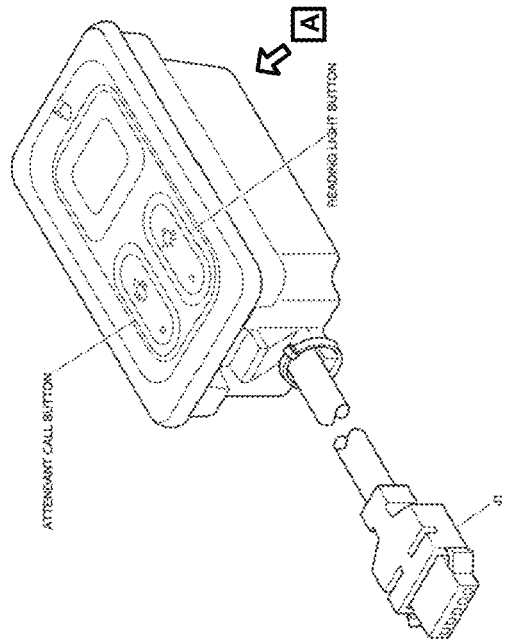
FIGS. 10C to 10E show various passenger controllers to which wireless transceivers are incorporated based on some implementations of the disclosed technology.
Figure 10C:
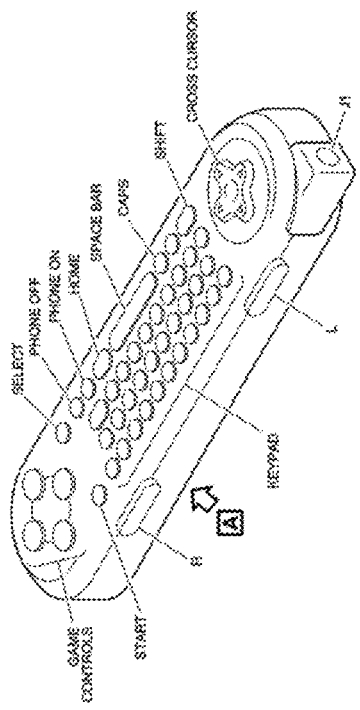
Figure 10D:
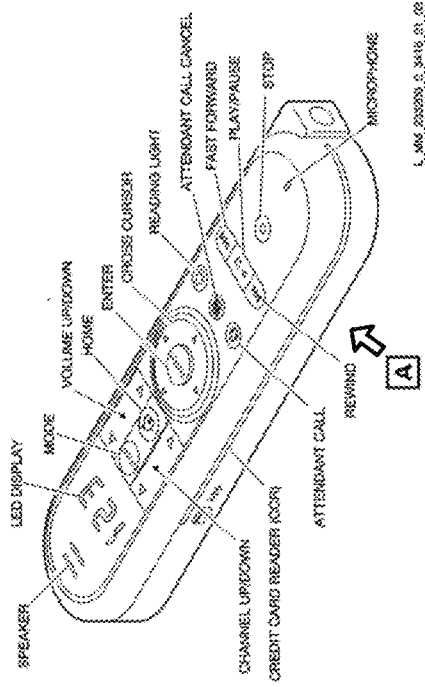

FIGS. 10A and 10B shows example views of passenger seats with wireless transceivers based on some implementations of the disclosed technology. In these implementations, the wireless transceivers are incorporated into passenger controllers. FIGS. 10C, 10D and 10E show various passenger controllers, to which the suggested wireless transceivers are incorporated. The passenger controllers may or may not have their own wireless transceivers. FIG. 10A shows an example of business class seats with wireless transceivers based on some implementations of the disclosed technology and FIG. 10B shows example of economy class seats with wireless transceivers based on some implementations of the disclosed technology. The passenger controllers are installed in the locations indicated with arrows in FIGS. 10A and 10B. In some implementations, the passenger controllers are installed on the side or on the top of the armrests of the passenger seats, and the wireless transceivers incorporated in the passenger controllers are also located on the side or top of the armrests of the passenger seats. However, other implementations are also possible without being limited to the side or the top of the armrests of the passenger seats. In both FIGS. 10A and 10B, the beam patterns 912, 914, 916, 918 of the wireless transceivers are along a lateral axis of the airplane. The lateral axis of the airplane runs from the wing tip to another wing tip and may be referred to as a lateral direction. The lateral direction may be perpendicular to the longitudinal direction of the airplane. In the implementations of FIGS. 10A and 10B, the beam patterns 912, 914, 916, 918 form certain angles between 0 and 180 degrees with respect to the lateral axis of the airplane. The beam patterns 912, 916 may be referred to as being directed to the starboard and the beam patterns 914, 918 may be referred to as being directed to the port.

Figure 11:
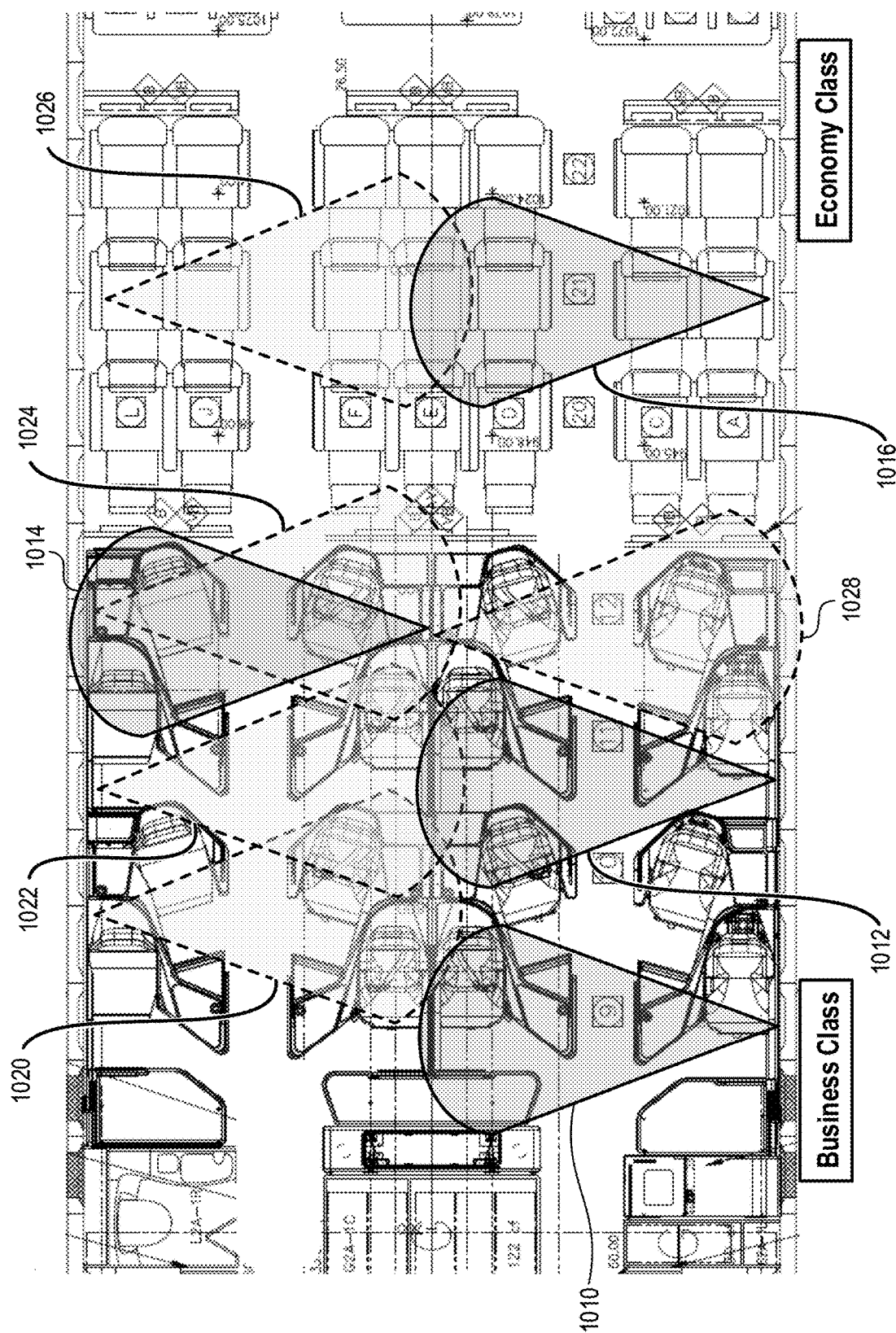
FIG. 11 shows an example top view of an inside of an airplane including wireless transceivers based on some implementations of the disclosed technology.

FIG. 11 shows an example top view of an inside of an airplane including wireless transceivers based on some implementations of the disclosed technology. The beam patterns as shown in FIG. 11 correspond to those of the wireless transceivers incorporated in the passenger controllers as discussed in FIGS. 10A to 10E, when the passenger controllers are installed at the armrests of the passenger seats. FIG. 11 shows two beam patterns of the wireless transceivers installed in the economy class seats and seven beam patterns of the wireless transceivers installed in the business class seats. The beam patterns 1010, 1012, 1014, 1016 are directed to starboard and the beam patterns 1020, 1022, 1024, 1026, 1028 are directed to port. In this case, even if the radio signals overlaps, such overlapping does not propagate along an airplane's fuselage as shown in FIG. 2A. Since the beam patterns 1020, 1022, 1024, 1026, 1028 do not have the backward direction, the overlapping range is limited and does not affect a greater number of passengers.

Figure 12:
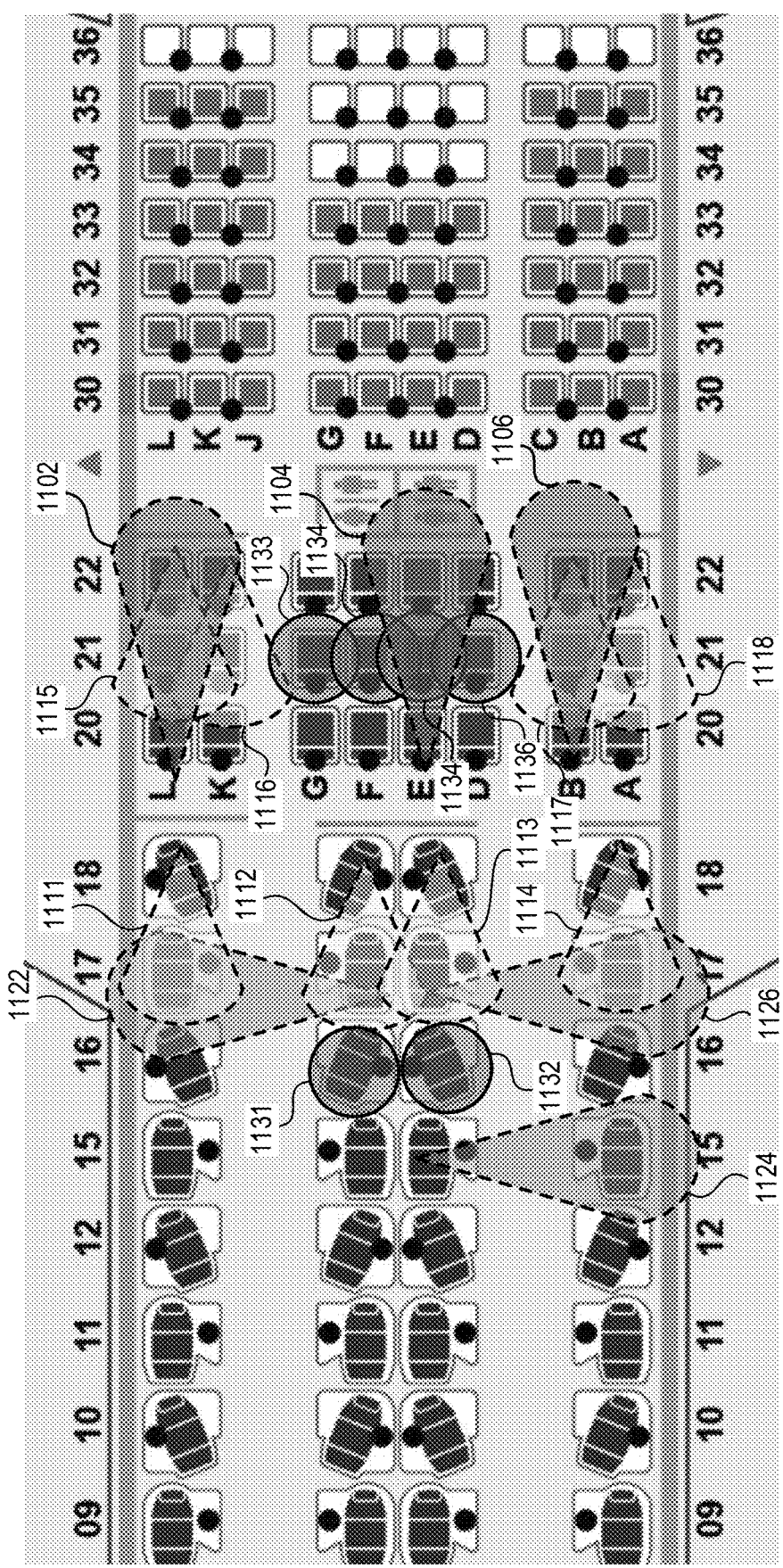
FIG. 12 shows a schematic view illustrating an inside of an airplane including wireless transceivers based on some implementations of the disclosed technology.

FIG. 12 shows a schematic view illustrating an inside of an airplane including wireless transceivers based on some implementations of the disclosed technology. The schematic view of FIG. 12 illustrates beam patterns of wireless transceivers installed to provide maximum coverage, minimum overlapping, and minimum transmission power application. In FIG. 12, different implementations as discussed in FIG. 3A to FIG. 11 are applied to the passenger seats. Further, in FIG. 12, the conventional beam pattern from the wireless transceivers installed in the monitors of the media playback devices are also applied. As long as the wireless transceivers suggested in this patent document are disposed in the airplane, even if the conventional wireless transceivers are disposed, the signal overlapping and congestion issues are not as severe as those in the conventional art where all wireless transceivers are included inside the media playback devices. In FIG. 12, the beam patterns 1102, 1104, 1106 correspond to the beam patterns of the wireless transceivers installed in the monitors of the media playback devices, which have the backward proceeding direction. The beam patterns 1111 to 1118 correspond to the beam patterns of the wireless transceivers installed in the headrests of the passenger seats or on the monitors of the media playback devices, which have the front proceeding direction or tilted proceeding direction that is the combination of the front direction and the upward direction. The beam patterns 1122, 1124, 1126 correspond to the beam patterns of the wireless transceivers installed in the passenger controllers, which have the sideway proceeding directions. The beam patterns 1131 to 1136 correspond to the beam patterns of the wireless transceivers installed in the armrests of the passenger seats, which have the upward proceeding direction.

In the discussions above, the radio signals may refer to the Bluetooth signals. However, the disclosed technology is not limited to the Bluetooth signals and the implementations of the disclosed technology can be applied to other radio signals such as Wi-Fi and others. Although the implementations discussed above describe the airplane as the example of a commercial passenger vehicle, the wireless transceivers as discussed above can be employed in other types of the commercial passenger vehicle such as a train, a ship, a bus, or others. The beam pattern of the wireless transceivers may refer to characteristics of the beam such as the direction and/or the orientation.

The wireless transceivers suggested in the disclosed technology are disposed at different locations within the airplane and have beam patterns that depend on the locations of the wireless transceivers. In some implementations, the directivity of the beam patterns of the wireless transceiver can be implemented using a directional beam antenna. The wireless transceivers for the passenger seats can be designed to include wireless transceivers as discussed in FIGS. 3A to 12. Thus, at least one set of 1) a first set of wireless transceivers disposed in armrests of the passenger seats, 2) a second set of wireless transceivers disposed in headrests of the passenger seats, 3) a third set of wireless transceivers disposed on a back of a monitor of the passenger seats, or 4) a fourth set of wireless transceivers disposed in passenger controllers can be disposed in the airplane. In some implementations, as long as at least one set of the first set to the fourth set of wireless transceivers is disposed in the airplane, it is also possible to include some wireless transceivers that are included in the media playback devices and having beam patterns along backward direction.

By having various sets of wireless transceivers in the airplane, it is possible to localize the wireless signal zones to minimize signal interferences and optimize radio signal distributions. For example, by configuring the wireless transceivers inside the airplane based on the implementations of the disclosed technology, it is possible to create localized wireless signal zones and accomplish the improved separations between wireless signal zones. For example, it is possible to reduce the impact on the wireless connections for the business passenger seats by the wireless connections for the economy passenger seats and vice versa. Some implementations of the disclosed technology allow to reduce power levels of the wireless transceivers due to the proximity of the locations relative to electronic devices of passengers. Operating the wireless transceivers at relatively less power levels further allow to reduce signal interferences and overlapping, which leads to improve the passenger experiences. The configurations of the wireless transceivers within the airplane can be suggested to allow custom power settings, less signal overlapping, improved signal coverages. Many considerations can be made to customize wireless signal zones, for example, based on the cabin design and the cabin layout. For example, the passenger seats on the last row can have the wireless transceiver having a forward proceeding direction, the passenger seats on the first row can have the wireless transceivers having a backward proceeding direction, the passenger seats on the middle rows can have the wireless transceivers having an upward proceeding direction.

Figure 13:
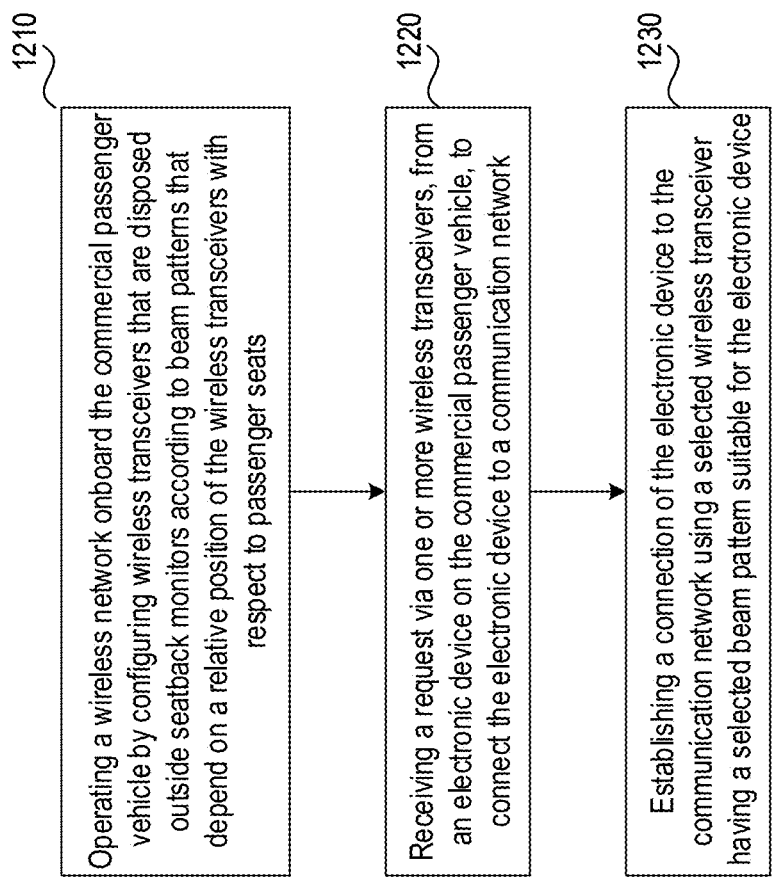
FIG. 13 shows an example flowchart of operations of providing a wireless access zone to passengers on a commercial passenger vehicle.

FIG. 13 shows an example of a method for supporting a wireless connectivity to passengers on a commercial passenger vehicle is provided.

At the operation 1210, a wireless network onboard the commercial passenger vehicle operates by configuring wireless transceivers that are disposed outside seatback monitors according to beam patterns that depend on a relative position of the wireless transceivers with respect to passenger seats. As discussed, the wireless transceivers have beam patterns that depend on locations of wireless transceivers, for example, the relative locations of the wireless transceivers with respect to passenger seats.

At the operation 1220, a request via one or more wireless transceivers is received from an electronic device on the commercial passenger vehicle, to connect the electronic device to a communication network. The electronic device can be a Bluetooth headphone and keyboard but is not limited thereto.

At the operation 1230, a connection of the electronic device to the communication network is established using a selected wireless transceiver having a selected beam pattern suitable for the electronic device. The selected wireless transceiver is selected to minimize a radio interference with other devices on the commercial passenger vehicle caused by wave propagations along the selected beam pattern.

Figure 14:
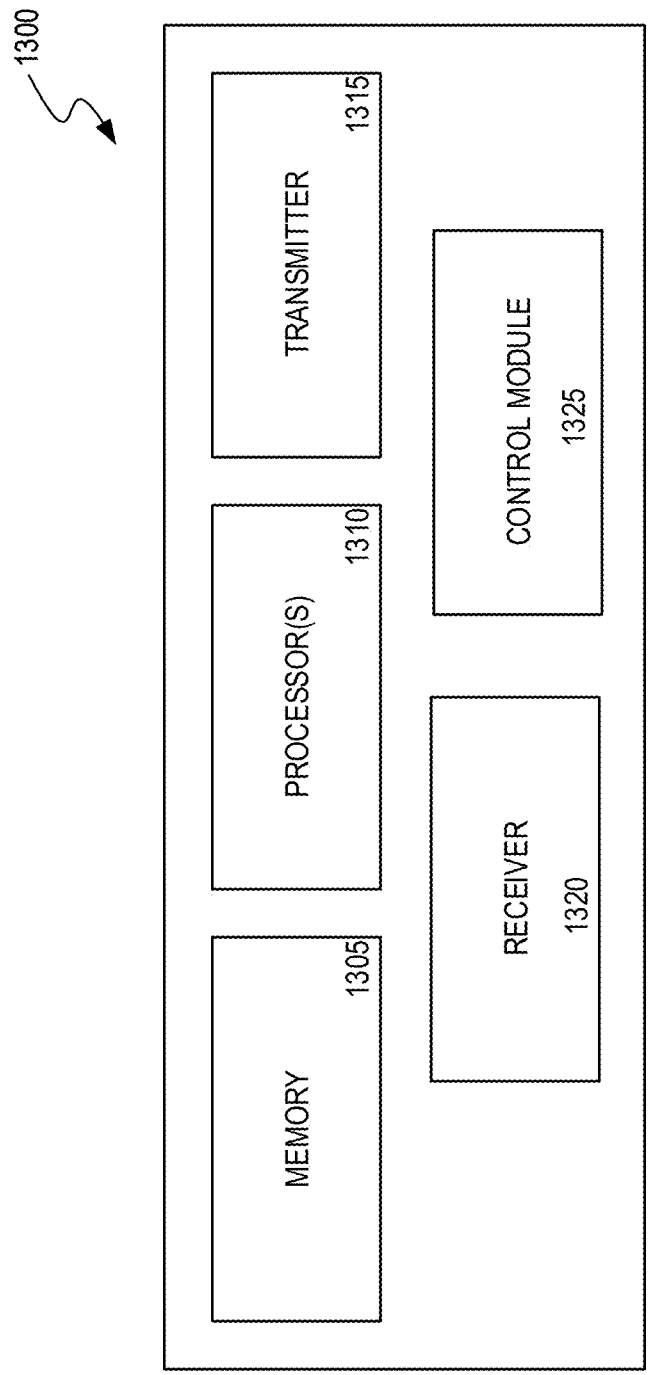
FIG. 14 shows an example of a block diagram of an in-flight server based on some implementations of the disclosed technology.

The wireless transceivers are communicatively coupled to one or more control devices to support the wireless connectivity for the passenger seats. The control devices can be implemented in various manners, for example, an in-vehicle server, a media playback device, a seat box, a zone terminator, or other hardware components. FIG. 14 shows an example block diagram of a control device communicatively coupled to a wireless device. The control device 1300 includes at least one processor 1310, a memory 1305, a transmitter 1315, a receiver 1320, a control module 1330. In other embodiments, additional, fewer, and/or different elements may be used to configure the control device 1300. The memory 1305 may store instructions to be executed by the processor 1310. The memory 1305 is an electronic holding place or storage for information or instructions so that the information or instructions can be accessed by the processor 1310. The memory 1305 can include, but is not limited to, any type of random access memory (RAM), any type of read only memory (ROM), any type of flash memory, etc., such as magnetic storage devices (e.g., hard disk, floppy disk, magnetic strips, etc.), optical disks (e.g., compact disk (CD), digital versatile discs (DVD), etc.), smart cards, flash memory devices, etc. The instructions upon execution by the processor 1310 configure the control device 1300 to perform the operations (e.g., establishing the wireless connection). The instructions executed by the processor 1310 may be carried out by a special purpose computer, logic circuits, or hardware circuits. The processor 1310 may be implemented in hardware, firmware, software, or any combination thereof. The term "execution" is, for example, the process of running an application or the carrying out of the operation called for by an instruction. The instructions may be written using one or more programming language, scripting language, assembly language, etc. By executing the instruction, the processor 1310 can perform the operations called for by that instruction.

The processor 1310 operably couples with the memory 1305, transmitter 1315, the receiver 1320, the control module 1330, etc., to receive, to send, and to process information and to control the operations of the control device 1300. The processor 1310 may retrieve a set of instructions from a permanent memory device such as a ROM device and copy the instructions in an executable form to a temporary memory device that is generally some form of RAM. In some implementations, the control device 1300 can include a plurality of processors that use the same or a different processing technology. The transmitter 1315 transmits or sends information or data to another device (e.g., the wireless transceivers, another server, media playback devices 104, or PEDs 112). The receiver 1320 receives information or data transmitted or sent by another device (e.g., the wireless transceivers, another server, media playback devices 104, or PEDs 112).

The control module 1325 of the control device 1300 is configured to perform operations to assist the in-vehicle system. In some implementations, the control module 1325 can be configured as a part of the processor 1310 and can perform an analysis and/or testing for wireless access provided in the commercial passenger vehicle. Although FIG. 14 shows the control module 1325 as included in the control device 1300, in some implementations, the control module 1325 can operate as a separate element from the in-vehicle server and work with a ground server (not shown) to facilitate the operations for providing wireless connections. In some implementations, the control module 1325 can operate a machine learning/artificial intelligence (AI) applications that perform various types of data analysis to automate analytical model building. Using algorithms that iteratively learn from data, machine learning applications can enable computers to learn without being explicitly programmed. The machine learning/AI module may be configured to use data learning algorithms to build models to interpret various data received from the various devices or components to detect, classify, and/or predict future outcomes. Such data learning algorithms may be associated with rule learning, artificial neural networks, inductive logic programming, and/or clustering. In some implementations, the control mode 1325 may assist the control device 1300 to perceive their environment and take actions that maximize the effectiveness of wireless access zones provided in the commercial passenger vehicle.

Various techniques preferably incorporated within some embodiments may be described using the following clause-based format.

1. An antenna system of an in-flight entertainment and communication (IFEC) system provided in a commercial passenger vehicle, the antenna system comprising: monitors associated with passenger seats on the commercial passenger vehicle and configured to display entertainment content for passengers; wireless transceivers disposed outside of the monitors and configured to transceive radio signals that have beam patterns defined according to locations of the wireless transceivers relative to passenger seats; and one or more control circuits communicatively coupled to the wireless transceivers and configured to support the wireless connectivity for the passengers through the wireless transceivers.

2. The antenna system of clause 1, wherein the wireless transceivers include at least one of 1) a first set of wireless transceivers disposed in armrests of first passenger seats, 2) a second set of wireless transceivers disposed in headrests of second passenger seats, 3) a third set of wireless transceivers disposed in close proximity to monitors of third passenger seats, or 4) a fourth set of wireless transceivers disposed in passenger controllers disposed at fourth passenger seats.

3. The antenna system of clause 2, wherein the first set of wireless transceivers have beam patterns in an upward direction with respect to a longitudinal axis of the commercial passenger vehicle.

4. The antenna system of clause 2, wherein the second set of wireless transceivers and the third set of wireless transceivers have beam patterns in a forward direction toward a front passenger seat.

5. The antenna system of clause 2, wherein the fourth set of wireless transceivers have beam patterns along a lateral axis of the commercial passenger vehicle.

6. The antenna system of clause 2, wherein the second set of wireless transceivers include at least one of a single piece antenna, a split type of an antenna including multiple pieces, a flat type of an antenna, a curved type of an antenna, a wire type of an antenna, or a plate type of an antenna, and wherein the second set of wireless transceivers include an antenna having a rectangular shape, an oval shape, or a circle shape.

7. The antenna system of clause 2, wherein the second set of wireless transceivers include a Yagi antenna, a phased array antenna, an inverted F antenna, a plate or helical antenna, a PCB (printed circuit board) antenna, or a miniature antenna.

8. The antenna system of clause 1, wherein the wireless transceivers are disposed at different locations with respect to passenger seats based on classes of the passenger seats.

9. An antenna system of an in-flight entertainment and communication (IFFC) system provided in a commercial passenger vehicle, the antenna system comprising: a first set of antennas, each contoured to be affixed on an armrest of a first passenger seat; a second set of antennas, each comprising one or more elements structured to be fitted within a headrest of a second passenger seat; a third set of antennas, each contoured to fit along a boundary of a seatback portion of a third passenger seat; and a fourth set of antennas, each contoured to fit in a passenger controller associated with a fourth passenger seat, and wherein the first set of antennas is coupled to a first electronic circuit and is configured to radiate a first beam pattern along an upward direction from the armrest of the first passenger seat, the second set of antennas is coupled to a second electronic circuit and is configured to radiate a second beam pattern along a forward direction towards a front seat of the second passenger seat, the third set of antennas is coupled to a third electronic circuit and is configured to radiate a third beam pattern along the forward direction, and the fourth set of antennas is coupled to a fourth electronic circuit and is configured to radiate a fourth beam pattern along a lateral axis of the commercial passenger vehicle.

10. The antenna system of clause 9, wherein the one or more elements correspond to a single element disposed on the passenger seat and having a rectangular shape, an elliptical shape, a circular shape, or a planner shape, or wherein the one or more elements correspond to multiple elements disposed on the passenger seat and having a rectangular shape, an elliptical shape, a circular shape, or a planner shape.

11. The antenna system of clause 9, wherein the one or more elements correspond to multiple elements disposed on the passenger seat and include at least one of a Yagi antenna, a phased array antenna, an inverted F antenna, a plate or helical antenna, a PCB (printed circuit board) antenna, or a miniature antenna.

12. The antenna system of clause 9, wherein the second set of antennas and the third set of antennas feed forward signals corresponding to the front seat of the second passenger seat from the second passenger seat.

13. The antenna system of clause 9, wherein the third set of antennas are disposed on a monitor of a fifth passenger seat that is located behind the third passenger seat.

14. A method for supporting a wireless connectivity to passengers on a commercial passenger vehicle, the method comprising: operating a wireless network onboard the commercial passenger vehicle by configuring wireless transceivers that are disposed outside seatback monitors according to beam patterns that depend on a relative position of the wireless transceivers with respect to passenger seats; receiving a request via one or more wireless transceivers, from an electronic device on the commercial passenger vehicle, to connect the electronic device to a communication network; and establishing a connection of the electronic device to the communication network using a selected wireless transceiver having a selected beam pattern suitable for the electronic device, and wherein the selected wireless transceiver is selected to minimize a radio interference with other devices on the commercial passenger vehicle caused by wave propagations along the selected beam pattern.

15. The method of clause 14, wherein the configuring the wireless transceivers includes at least one of 1) configuring a first set of wireless transceivers disposed in armrests of first passenger seats, 2) configuring a second group of wireless transceivers disposed in headrests of second passenger seats, 3) configuring a third group of wireless transceivers disposed in proximity of third passenger seats, or 4) configuring a fourth group of wireless transceivers disposed in passenger controllers disposed at fourth passenger seats.

16. The method of clause 14, wherein the configuring the wireless transceivers includes configuring multiple wireless transceivers in one passenger seat.

17. The method of clause 14, wherein the configuring the wireless transceivers includes configuring the wireless transceivers in the passenger seats in one to one correspondence.

18. The method of clause 14, wherein the configuring the wireless transceivers includes configuring a wireless transceiver as one single component.

19. The method of clause 14, wherein the configuring the wireless transceivers includes configuring a wireless transceiver with multiple components.

20. The method of clause 14, wherein the beam patterns include at least one of an upward direction toward a ceiling of the commercial passenger vehicle, a forward direction toward a front seat of a corresponding passenger seat, an upward direction, or a lateral direction along a lateral axis of the commercial passenger vehicle.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this patent document.

What is claimed is:

1. An antenna system of an in-flight entertainment and communication (IFEC) system provided in a commercial passenger vehicle, the antenna system comprising:
   monitors associated with passenger seats on the commercial passenger vehicle and configured to display entertainment content for passengers;
   wireless transceivers disposed outside of the monitors and configured to transceive radio signals that have beam patterns defined according to locations of the wireless transceivers relative to passenger seats; and
   one or more control circuits communicatively coupled to the wireless transceivers and configured to support a wireless connectivity for the passengers through the wireless transceivers, and
   wherein the wireless transceivers include 1) a first set of wireless transceivers configured to receive and transmit the radio signals and disposed in armrests of first passenger seats, 2) a second set of wireless transceivers configured to receive and transmit the radio signals and disposed in headrests of second passenger seats, 3) a third set of wireless transceivers configured to receive and transmit the radio signals and disposed in close proximity to monitors of third passenger seats, and 4) a fourth set of wireless transceivers configured to receive and transmit the radio signals and disposed in passenger controllers disposed at fourth passenger seats, and
   wherein the first set of wireless transceivers is coupled to a first electronic circuit and configured to radiate a first beam pattern along an upward direction from the armrests of the first passenger seats, and the second set of wireless transceivers is coupled to a second electronic circuit and is configured to radiate a second beam pattern along a forward direction towards a front seat of the second passenger seats, the third set of wireless transceivers is coupled to a third electronic circuit and is configured to radiate a third beam pattern along the forward direction, and the fourth set of wireless transceivers is coupled to a fourth electronic circuit and is configured to radiate a fourth beam pattern along a lateral axis of the commercial passenger vehicle.

2. The antenna system of claim 1, wherein the first set of wireless transceivers have beam patterns in an upward direction with respect to a longitudinal axis of the commercial passenger vehicle.

3. The antenna system of claim 1, wherein the second set of wireless transceivers and the third set of wireless transceivers have beam patterns in a forward direction toward a front passenger seat.

4. The antenna system of claim 1, wherein the fourth set of wireless transceivers have beam patterns along a lateral axis of the commercial passenger vehicle.

5. The antenna system of claim 1, wherein the second set of wireless transceivers includes at least one of a single piece antenna, a split type of an antenna including multiple pieces, a flat type of an antenna, a curved type of an antenna, a wire type of an antenna, or a plate type of an antenna, and wherein the second set of wireless transceivers include an antenna having a rectangular shape, an oval shape, or a circle shape.

6. The antenna system of claim 1, wherein the second set of wireless transceivers includes a Yagi antenna, a phased array antenna, an inverted F antenna, a plate or helical antenna, a PCB (printed circuit board) antenna, or a miniature antenna.

7. The antenna system of claim 1, wherein the wireless transceivers are disposed at different locations with respect to passenger seats based on classes of the passenger seats.

8. An antenna system of an in-flight entertainment and communication (IFFC) system provided in a commercial passenger vehicle, the antenna system comprising:
   a first set of antennas, each contoured to be affixed on an armrest of a first passenger seat;
   a second set of antennas, each comprising one or more elements structured to be fitted within a headrest of a second passenger seat;

a third set of antennas, each contoured to fit along a boundary of a seatback portion of a third passenger seat; and a fourth set of antennas, each contoured to fit in a passenger controller associated with a fourth passenger seat, and wherein the first set of antennas is coupled to a first electronic circuit and is configured to radiate a first beam pattern along an upward direction from the armrest of the first passenger seat, the second set of antennas is coupled to a second electronic circuit and is configured to radiate a second beam pattern along a forward direction towards a front seat of the second passenger seat, the third set of antennas is coupled to a third electronic circuit and is configured to radiate a third beam pattern along the forward direction, and the fourth set of antennas is coupled to a fourth electronic circuit and is configured to radiate a fourth beam pattern along a lateral axis of the commercial passenger vehicle.

9. The antenna system of claim 8, wherein the one or more elements correspond to a single element disposed on the second passenger seat and having a rectangular shape, an elliptical shape, a circular shape, or a planner shape, or wherein the one or more elements correspond to multiple elements disposed on the second passenger seat and having a rectangular shape, an elliptical shape, a circular shape, or a planner shape.

10. The antenna system of claim 8, wherein the one or more elements correspond to multiple elements disposed on the second passenger seat and include at least one of a Yagi antenna, a phased array antenna, an inverted F antenna, a plate or helical antenna, a PCB (printed circuit board) antenna, or a miniature antenna.

11. The antenna system of claim 8, wherein the second set of antennas and the third set of antennas feed forward signals corresponding to the front seat of the second passenger seat from the second passenger seat.

12. The antenna system of claim 8, wherein the third set of antennas are disposed on a monitor of a fifth passenger seat that is located behind the third passenger seat.

13. A method for supporting a wireless connectivity to passengers on a commercial passenger vehicle, the method comprising:

operating a wireless network onboard the commercial passenger vehicle by configuring wireless transceivers that are disposed outside seatback monitors according to beam patterns that depend on a relative position of the wireless transceivers with respect to passenger seats;

receiving a request via one or more wireless transceivers, from an electronic device on the commercial passenger vehicle, to connect the electronic device to a communication network; and establishing a connection of the electronic device to the communication network using a selected wireless transceiver having a selected beam pattern suitable for the electronic device, and wherein the selected wireless transceiver is selected to minimize a radio interference with other devices on the commercial passenger vehicle caused by wave propagations along the selected beam pattern, and wherein the configuring of the wireless transceivers includes 1) configuring a first set of wireless transceivers operating to receive and transmit radio signals and disposed in armrests of first passenger seats, 2) configuring a second set of wireless transceivers operating to receive and transmit the radio signals and disposed in headrests of second passenger seats, 3) configuring a third set of wireless transceivers operating to receive and transmit the radio signals and disposed in close proximity to monitors of third passenger seats, and 4) configuring a fourth set of wireless transceivers operating to receiving and transmit the radio signals and disposed in passenger controllers disposed at fourth passenger seats, and wherein the first set of wireless transceivers is coupled to a first electronic circuit and configured to radiate a first beam pattern along an upward direction from the armrests of the first passenger seats, and the second set of wireless transceivers is coupled to a second electronic circuit and is configured to radiate a second beam pattern along a forward direction towards a front seat of the second passenger seats, the third set of wireless transceivers is coupled to a third electronic circuit and is configured to radiate a third beam pattern along the forward direction, and the fourth set of wireless transceivers is coupled to a fourth electronic circuit and is configured to radiate a fourth beam pattern along a lateral axis of the commercial passenger vehicle.

14. The method of claim 13, wherein the configuring the wireless transceivers includes configuring multiple wireless transceivers in one passenger seat.

15. The method of claim 13, wherein the configuring the wireless transceivers includes configuring the wireless transceivers in the passenger seats in one to one correspondence.

16. The method of claim 13, wherein the configuring the wireless transceivers includes configuring a wireless transceiver as one single component.

17. The method of claim 13, wherein the configuring the wireless transceivers includes configuring a wireless transceiver with multiple components.

18. The method of claim 13, wherein the beam patterns include at least one of an upward direction toward a ceiling of the commercial passenger vehicle, a forward direction toward a front seat of a corresponding passenger seat, an upward direction, or a lateral direction along a lateral axis of the commercial passenger vehicle.

* * * * *